United States Patent
Whyte et al.

(10) Patent No.: US 12,400,014 B1
(45) Date of Patent: Aug. 26, 2025

(54) DIGITAL DOCUMENT ORGANIZER SERVICE

(71) Applicant: Avalara, Inc., Seattle, WA (US)

(72) Inventors: Gavin Whyte, Raleigh, NC (US); Samantha Chan, Chapel Hill, NC (US); Albert Michael Boulus, Cary, NC (US); Meir Lowy, Spring Valley, NY (US); Henry Nove, Monroe, NY (US); Michael J. Maselli, Cary, NC (US); Abraham Brach, Monsey, NY (US); Scott Seely, Galesville, WI (US); Naveen Kumar Agrawal, Bellevue, WA (US)

(73) Assignee: Avalara, Inc., Seattle, WA (US)

( * ) Notice: Subject to any disclaimer, the term of this patent is extended or adjusted under 35 U.S.C. 154(b) by 346 days.

(21) Appl. No.: 18/045,412

(22) Filed: Oct. 10, 2022

(51) Int. Cl.
  *G06F 21/62* (2013.01)
  *G06F 16/955* (2019.01)

(52) U.S. Cl.
  CPC ...... *G06F 21/6218* (2013.01); *G06F 16/9558* (2019.01); *G06F 16/9566* (2019.01)

(58) Field of Classification Search
  None
  See application file for complete search history.

(56) References Cited

U.S. PATENT DOCUMENTS

| | | | |
|---|---|---|---|
| 7,783,536 B2 | 8/2010 | William et al. | |
| 7,933,803 B1 | 4/2011 | Nadler et al. | |
| 8,620,578 B1 | 12/2013 | Brown et al. | |
| 8,725,407 B2 | 5/2014 | Hurley et al. | |
| 9,158,785 B1 * | 10/2015 | Rudkowski | H04L 67/1095 |
| 9,760,915 B2 | 9/2017 | Pavlou et al. | |
| 10,332,216 B2 | 6/2019 | Barsade et al. | |
| 10,445,818 B1 | 10/2019 | Chowdhary | |
| 10,630,648 B1 * | 4/2020 | Borunda | H04L 9/3213 |
| 10,769,611 B2 | 9/2020 | Mcneel | |
| 10,872,100 B1 | 12/2020 | Shefferman et al. | |
| 11,176,620 B1 | 11/2021 | Lubczynski et al. | |

(Continued)

OTHER PUBLICATIONS

1Edtech, Open Badges 2.0 Implementation Guide, 2018, IMS Global, 8 Pages (Year: 2018).*

(Continued)

*Primary Examiner* — Christopher C Harris
(74) *Attorney, Agent, or Firm* — Nicholson, De Vos, Webster & Elliott, LLP

(57) ABSTRACT

A method performed by a computer system for providing a digital document organizer service is disclosed. The method includes generating a digital document organizer for a user of an online software platform, adding at least a digital document to the digital document organizer, wherein the digital document represents a certification issued by a certifying authority, generating metadata associated with the digital document based on analyzing the digital document, storing metadata associated with the digital document, receiving, over a network, a request by the user to view the digital document, retrieving the digital document from a database in response to receiving a request to view the digital document, and transmitting the digital document and the metadata associated with the digital document to a device operated by the user as a response to the request to view the document.

12 Claims, 20 Drawing Sheets

(56) References Cited

U.S. PATENT DOCUMENTS

| | | | |
|---|---|---|---|
| 11,238,542 B1 | 2/2022 | Wixted et al. | |
| 2002/0138765 A1 | 9/2002 | Fishman et al. | |
| 2007/0136158 A1 | 6/2007 | Rawlings et al. | |
| 2007/0136159 A1 | 6/2007 | Rawlings et al. | |
| 2007/0220614 A1* | 9/2007 | Ellis | G06F 21/645 |
| | | | 726/27 |
| 2009/0150169 A1* | 6/2009 | Kirkwood | G06Q 40/00 |
| | | | 705/342 |
| 2009/0187500 A1 | 7/2009 | Wilson et al. | |
| 2010/0332404 A1* | 12/2010 | Valin | G06Q 99/00 |
| | | | 705/310 |
| 2013/0013471 A1 | 1/2013 | Fishman | |
| 2013/0227271 A1* | 8/2013 | Pampagnin | G06F 21/1086 |
| | | | 709/202 |
| 2014/0067929 A1* | 3/2014 | Kirigin | H04L 67/06 |
| | | | 709/204 |
| 2014/0172656 A1 | 6/2014 | Shaw | |
| 2014/0351105 A1 | 11/2014 | Hamm | |
| 2015/0261974 A1* | 9/2015 | Kirigin | H04L 63/10 |
| | | | 726/29 |
| 2016/0042466 A1 | 2/2016 | Herndon et al. | |
| 2016/0140668 A1 | 5/2016 | Maguire et al. | |
| 2017/0017646 A1* | 1/2017 | Kumar | G06F 21/00 |
| 2017/0099344 A1* | 4/2017 | Hadfield | H04L 63/20 |
| 2018/0293395 A1* | 10/2018 | Kato | H04L 63/061 |
| 2019/0114609 A1 | 4/2019 | Burton et al. | |
| 2020/0076612 A1* | 3/2020 | Adluri | H04L 9/3239 |
| 2021/0089500 A1* | 3/2021 | Ball | H04L 67/06 |
| 2021/0158456 A1 | 5/2021 | Morgan et al. | |
| 2022/0171881 A1* | 6/2022 | Renn | G06F 21/645 |
| 2022/0271958 A1* | 8/2022 | Bassili | H04L 9/321 |
| 2023/0185767 A1* | 6/2023 | Hung | G06F 16/152 |
| | | | 713/189 |
| 2023/0214508 A1* | 7/2023 | Munisamy | G06F 21/6218 |
| | | | 726/29 |
| 2023/0247018 A1* | 8/2023 | Dutt | H04L 63/0861 |
| | | | 713/153 |

OTHER PUBLICATIONS

Wikipedia, "Apple Wallet," last edited Oct. 10, 2022, downloaded from https://en.wikipedia.org/wiki/Apple_Wallet, 6 pages.

Wikipedia, "Google Docs," last edited Oct. 10, 2022, downloaded from https://en.wikipedia.org/wiki/Google_Docs, 9 pages.

* cited by examiner

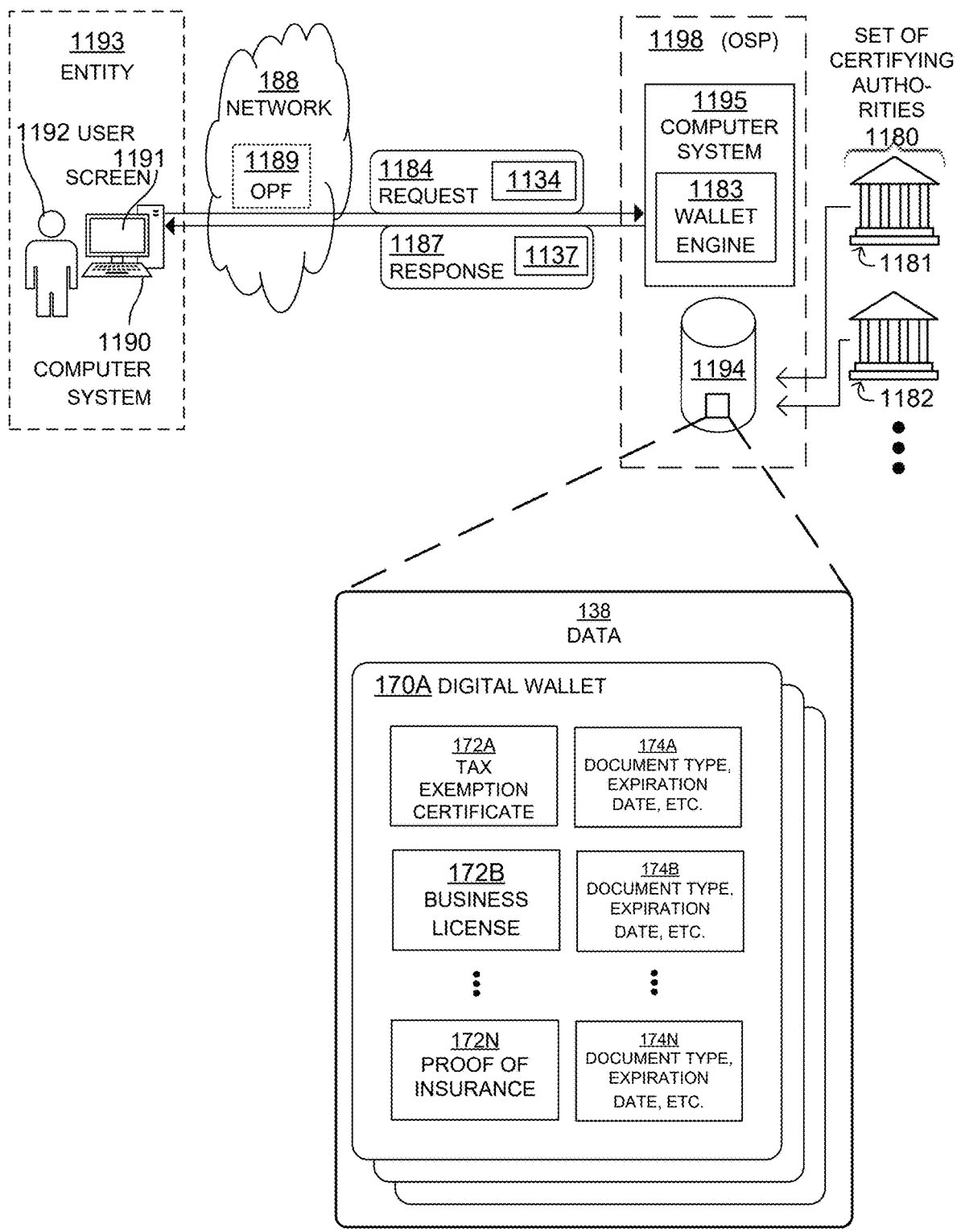
FIG. 11      USE CASE

DOCUMENT UPLOAD

DOCUMENT SHARING (RECIPIENT)

*EXPIRATION NOTIFICATION*

COMPLIANCE BADGE

DIGITAL DOCUMENT ORGANIZER SERVICE

BACKGROUND

Businesses are often required to carry various kinds of documentation that show proof of compliance or qualification related to their business, and to present the documentation when requested. For example, a business may be required to carry a proof of tax compliance, a proof of insurance, a business license, a health department approval, an alcohol license, a wholesale license, etc. As a further example, a professional service provider (e.g., electrician, general contractor, and/or other licensed professional) may be required to carry documentation showing that the service provider is licensed to perform certain services or other proof of qualification. It can be burdensome and inconvenient for business owners (or agents of the business) to carry around such documentation and to make the documentation available upon request, particularly if the business involves traveling to various sites (e.g., plumbing services and electrician services) and/or involves on-site public interaction (e.g., retail stores and restaurants). Sometimes it is difficult for a business to know what type of documentation it needs to carry to be compliant with various rule and regulations. Certifications issued by certifying authorities often have to be renewed on a recurring basis. Not renewing a certification in a timely manner may result in levying of fines and/or loss of operations. Having to carry documentation, present the documentation upon request, and keep track of renewal dates can be burdensome and cause anxiety for business owners.

All subject matter discussed in this Background section of this document is not necessarily prior art, and may not be presumed to be prior art simply because it is presented in this Background section. Plus, any reference to any prior art in this description is not, and should not be taken as, an acknowledgement or any form of suggestion that such prior art forms parts of the common general knowledge in any art in any country. Along these lines, any recognition of problems in the prior art discussed in this Background section or associated with such subject matter should not be treated as prior art, unless expressly stated to be prior art. Rather, the discussion of any subject matter in this Background section should be treated as part of the approach taken towards the particular problem by the inventors. This approach in and of itself may also be inventive.

SUMMARY

The present description gives instances of computer systems, storage media that may store programs, and methods.

In embodiments, an online software platform (OSP) computer system is configured to provide a digital document organizer service. The OSP computer system may generate a digital document organizer for a user of the OSP, add at least a digital document to the digital document organizer, wherein the digital document represents a certification issued by a certifying authority, generate metadata associated with the digital document based on analyzing the digital document, store the metadata associated with the digital document, receive, over a network, a request by the user to view the digital document, retrieve the digital document from a database in response to receiving the request to view the digital document, and transmit, over the network, the digital document and the metadata associated with the digital document to a device operated by the user as a response to the request to view the document. The digital document may be provided by the user (e.g., in the request itself), pulled/imported from a certifying authority, or pushed by the certifying authority to the OSP computer system via an application programming interface (API) exposed by the OSP towards the certifying authority.

An advantage of the digital document organizer service can be that it allows users of the OSP to store, organize, and manage digital documents in a centralized manner. The digital document organizer service may allow users to use their computing devices to easily and quickly access their digital documents on demand from anywhere they have network access. This avoids the need for users to carry around physical documentation papers.

In an embodiment, the OSP computer system determines that a notification associated with the digital document is to be generated based on the metadata associated with the digital document, generates the notification associated with the digital document in response to the determination that the notification associated with the digital document is to be generated, and transmits, over the network, the notification associated with the digital document such that the user can view the notification. In an embodiment, the metadata associated with the digital document includes an expiration date associated with the digital document, wherein the determination that the notification associated with the digital document is to be generated is based on a determination that the expiration date is less than a threshold number of days away from a current date.

An advantage of the digital document organizer service may be that it notifies users when certifications are about to expire, which helps ensure that the users can operate their business without penalties and without disruption of services.

In an embodiment, the OSP computer system receives, over the network, a request by the user to share one or more documents in the digital document organizer with a third party and shares the one or more documents with the third party in response to receiving the request to share the one or more documents. In an embodiment, the one or more documents are shared with the third party by generating a link that is usable by the third party to access the one or more documents and transmitting, over the network, the link to the third party such that the third party can use the link to access the one or more digital documents. In an embodiment, the link is a uniform resource locator (URL) that includes a query string, wherein the query string includes an indication of the one or more digital documents being shared, an indication of access rights being granted, an indication of an access expiration date, and a digital signature that was generated based on parts of the query string and signed by a private key.

An advantage of the digital document organizer service may be that it allows user to easily share digital documents with third parties in a secure manner.

In an embodiment, the OSP computer system receives, over the network, a request by the user to generate a compliance badge, generates the compliance badge in response to a determination that the digital document organizer includes a set of documents that fulfill a set of requirements associated with the compliance badge, and transmits, over the network, the compliance badge such that the compliance badge can be published to an external platform.

Having a compliance badge issued by the OSP may help increase customer confidence in the business.

As such, it will be appreciated that results of embodiments are larger than the sum of their individual parts, and have utility.

These and other features and advantages of the claimed invention will become more readily apparent in view of the embodiments described and illustrated in this specification, namely in this written specification and the associated drawings.

BRIEF DESCRIPTION OF THE DRAWINGS

The invention may best be understood by referring to the following description and accompanying drawings that are used to illustrate embodiments of the invention. In the drawings:

FIG. 11 is diagram for an operational example and use case where the digital document organizer is a digital wallet for storing, organizing, and managing digital documents representing business documents.

DETAILED DESCRIPTION

As has been mentioned, the present description is about computer systems, storage media that may store programs, and methods. Embodiments are now described in more detail.

Figure 1:
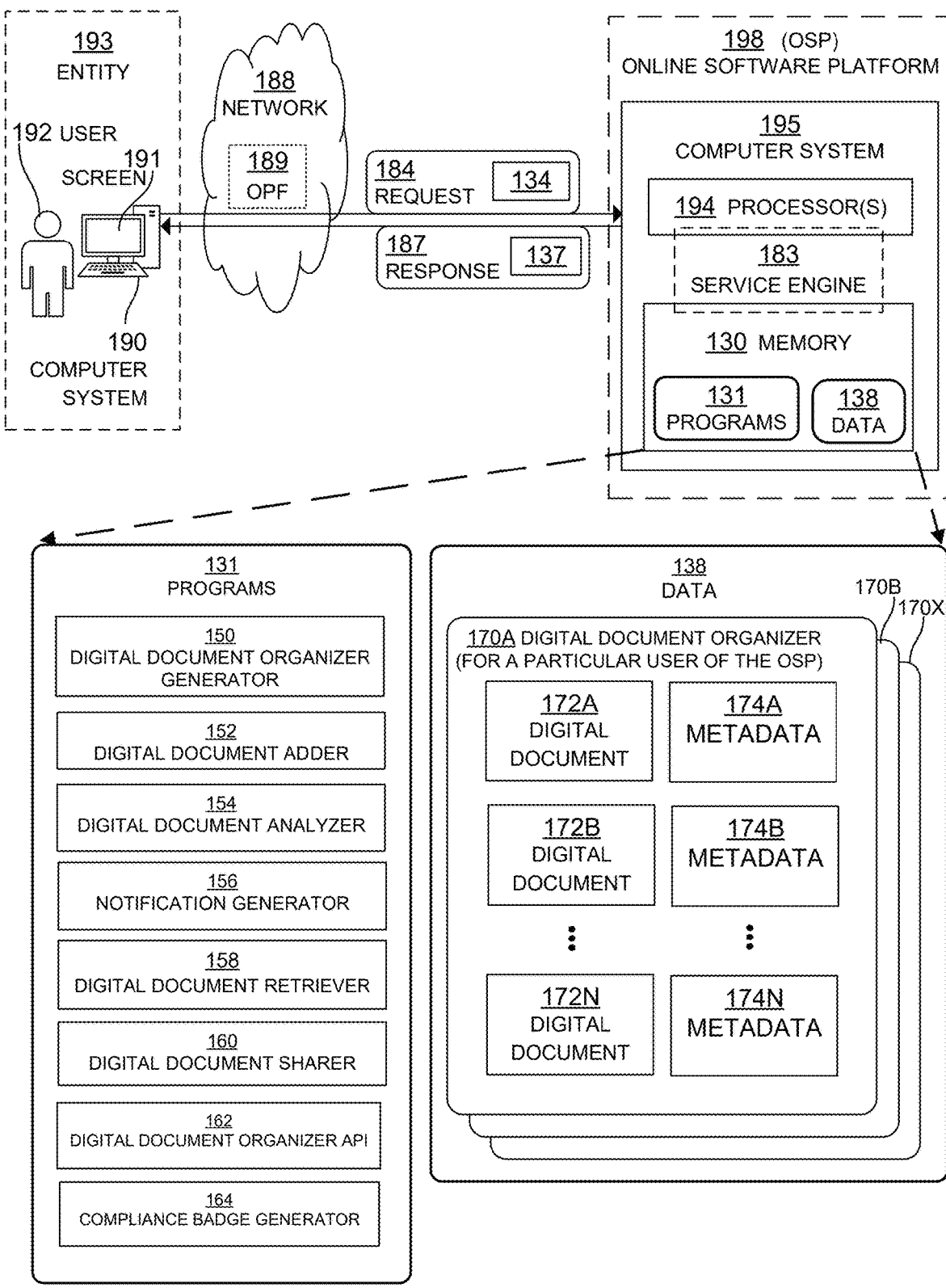
FIG. 1 is a diagram showing sample aspects of embodiments.

FIG. 1 is a diagram showing sample aspects of embodiments.

A sample online software platform (OSP) computer system 195 according to embodiments is shown. The OSP computer system 195 may optionally be implemented as part of an online software platform (OSP) 198. As such, the OSP computer system 195 can be located in "the cloud."

The OSP computer system 195 has one or more processors 194 and a memory 130. The memory 130 stores programs 131 and data 138. As shown in the diagram, the programs 131 include various components that can be used for providing a digital document organizer service to users of the OSP 198 such as a digital document organizer generator 150, a digital document adder 152, a digital document analyzer 154, a notification generator 156, a digital document retriever 158, a digital document sharer 160, a digital document organizer application programming interface (API) 162, and a compliance badge generator 164. The data 138 may include digital document organizers 170 for different users of the OSP 198. For example, the diagram shows the data 138 including digital document organizers 170A (e.g., for user A), 170B (e.g., for user B), and 170X (e.g., for user X). Each digital document organizer 170 may include one or more digital documents 172 and each digital document 172 may have metadata 174 associated with it. For example, as shown in the diagram, digital document organizer 170A includes digital document 172A and its associated metadata 174A, digital document 172B and its associated metadata 174B, and digital document 172N and its associated metadata 174N. It should be noted that the diagram shows a logical depiction of the data 138 for sake of illustration and is not meant to show how the data 138 is actually stored in the memory 130. Those skilled in the art will understand that there are various possible ways that the data 138 may be stored, structured, and organized in the memory 130 (e.g., the digital documents 172 and the metadata 174 may be stored in separate databases and/or database tables). In an embodiment, digital document organizers 170 (including the digital documents 172 and/or metadata therein) are stored in encrypted form.

The one or more processors 194 and the memory 130 of the OSP computer system 195 may implement a service engine 183 for providing the digital document organizer service. Additional implementation details for the OSP computer system 195 are given later in this document.

The OSP 198 can be configured to perform one or more predefined services, for example via operations of the service engine 183. Such services can be searches, determinations, computations, verifications, notifications, the transmission of specialized information, including data that effectuates payments, the generation and transmission of documents, the online accessing other systems to effect registrations, and so on, including what is described in this document. Such services can be provided as a Software as a Service (SaaS).

A user 192 may be standalone. The user 192 may use a computer system 190 that has a screen 191, on which User Interfaces (UIs) may be shown. Additional sample implementation details for the computer system 190 are given later in this document. In embodiments, the user 192 and the computer system 190 are considered part of an entity 193. In such instances, the user 192 can be an agent of the entity 193, and even within a physical site of the entity 193, although that is not necessary. In embodiments, the computer system 190 or other device of the user 192 are client devices for the OSP computer system 195. The user 192 or the entity 193 can be clients/customers of the OSP 198. For instance, the user 192 may log into the OSP computer system 195 by using credentials, such as a user name, a password, a token, and so on to access service provided by the OSP 198.

The computer system 190 may access the OSP computer system 195 via a communications network 188, such as the internet. In particular, the entities and associated systems of FIG. 1 may communicate via physical and logical channels of the communication network 188. For example, information may be communicated as data using the Internet Protocol (IP) suite over a packet-switched network such as the internet or other packet-switched network, which may be included as part of the communication network 188. The communication network 188 may include many different types of computer networks and communication media including those utilized by various different physical and logical channels of communication, now known or later developed. Non-limiting media and communication channel examples include one or more, or any operable combination of: fiber optic systems, satellite systems, cable systems, microwave systems, asynchronous transfer mode ("ATM") systems, frame relay systems, digital subscriber line ("DSL") systems, radio frequency ("RF") systems, telephone systems, cellular systems, other wireless systems, and the internet. In various embodiments the communication network 188 can be or include any type of network, such as a local area network (LAN), a metropolitan area network (MAN), a wide area network (WAN), or the internet. Accordingly, from certain perspectives, the OSP 198 is in the cloud, and can be drawn within the communication network 188.

The computer system 190 and the OSP computer system 195 may exchange requests and responses with each other. Such can be implemented with a number of architectures.

In one such architecture, a device remote to the service engine 183, such as the computer system 190, may have a certain application (not shown) and a connector (not shown) that is a plugin that sits on top of that certain application. The connector may be able to fetch from the remote device the details required for the service desired from the OSP 198, form an object or payload 134, and then send or push a request 184 that carries the payload 134 to the service engine 183 via a service call. The service engine 183 may receive the request 184 with the payload 134. The service engine 183 may then perform operations based on the payload 134, form a payload 137 that is an aspect of the performed operations, and then push, send, or otherwise cause to be transmitted a response 187 that carries the payload 137 to the connector. The connector reads the response 187 and forwards the payload 137 to the certain application.

In an alternative such architecture, a device remote to the service engine 183, such as the computer system 190, may have a particular application (not shown). In addition, the OSP computer system 195 implements a REST (Representational State Transfer) API (Application Programming Interface) (not shown). REST or RESTful API design is designed to take advantage of existing protocols. While REST can be used over nearly any protocol, it usually takes advantage of HTTP (Hyper Text Transfer Protocol) when used for Web APIs. This alternative architecture enables the entity 193 to directly consume a REST API from their particular application, without using a connector. The particular application of the remote device may be able to fetch internally from the remote device the details required for the service desired from the OSP 198, and thus send or push the request 184 to the REST API. In turn, the REST API talks in the background to the service engine 183. Again, the service engine 183 performs operations, and sends an aspect of the performed operations back to the REST API. In turn, the REST API sends the response 187 that has the payload 137 to the particular application.

Moreover, in some embodiments, data from the computer system 190 and/or from the OSP computer system 195 may be stored in an Online Processing Facility (OPF) 189 that can run software applications, perform operations, and so on. In such embodiments, requests and responses may be exchanged with the OPF 189. In such embodiments, the computer system 190 and any devices of the OPF 189 can be considered to be remote devices, at least from the perspective of the OSP computer system 195.

In an embodiment, as mentioned above, the OSP computer system 195 may implement a service engine 183 for providing a digital document organizer service to users of the OSP 198. The OSP computer system 195 may provide the digital document organizer service based on executing programs 131 stored in the memory 130. These programs 131 may include various components such as the digital document organizer generator 150, the digital document adder 152, the digital document analyzer 154, the notification generator 156, the digital document retriever 158, the digital document sharer 160, the digital document organizer API 162, and/or the compliance badge generator 164.

As will be described in additional detail herein, the digital document organizer generator 150 may be used to generate a new digital document organizer 170 for a user of the OSP 198 (e.g., for user 192). The digital document adder 152 may be used to add a digital document to an existing digital document organizer 170. The digital document analyzer 154 may be used to analyze a digital document 172 to generate metadata 174 associated with the digital document 172. The notification generator 156 may be used to generate a notification associated with a digital document 172. The digital document retriever 158 may be used to retrieve a digital document 172 from a digital document organizer 170 for presenting to a user. The digital document sharer 160 may be used to share one or more digital documents with a third party. The digital document organizer API may be used to allow a certifying authority to interface with the digital document organizer service (e.g., to allow the certifying authority to add, update, and/or delete digital documents to/from a digital document organizer 170). The compliance badge generator 164 may be used to generate a compliance badge.

While a particular organization/structure of components is shown in the diagram, it should be understood that such organization/structure is provided by way of example to illustrate a particular embodiment and that other embodiments may organize components differently to achieve the same/similar functionality. Example operations of various components of the programs 131 are described in additional detail herein below to illustrate an embodiment. For ease of description, the components are described herein as performing certain operations. Those skilled in the art will understand this to mean that the OSP computer system 195 is performing operations based on executing or activating those components.

Figure 2:
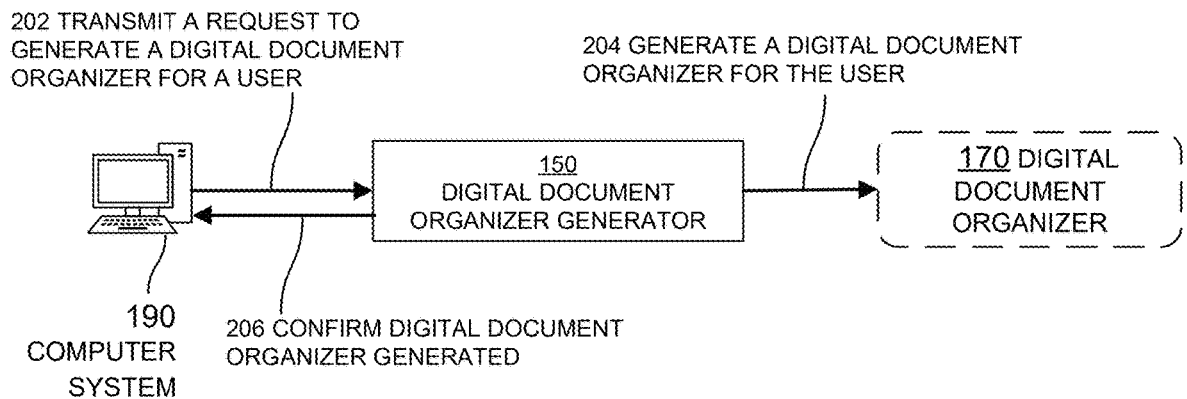
FIG. 2 is a diagram showing operations for generating a digital document organizer, according to embodiments.

FIG. 2 is a diagram showing operations for generating a digital document organizer, according to embodiments. The operations shown in the diagram may be performed when a user of the OSP operating the computer system 190 submits a request to the OSP to create a digital document organizer 170 (e.g., through a GUI of the OSP). At operation 202, the computer system 190 transmits a request to the digital document organizer generator 150 to generate the digital document organizer 170 for the user. Responsive to receiving this request, at operation 204, the digital document organizer generator 150 generates a new digital document organizer 170 for the user. If the user's digital document organizer 170 is successfully generated, at operation 206, the digital document organizer generator 150 transmits a confirmation to the computer system 190 indicating that the user's digital document organizer 170 has been generated. As will be described in additional detail herein, the digital document organizer 170 may be used to store, organize, and/or manage digital documents.

Figure 3:
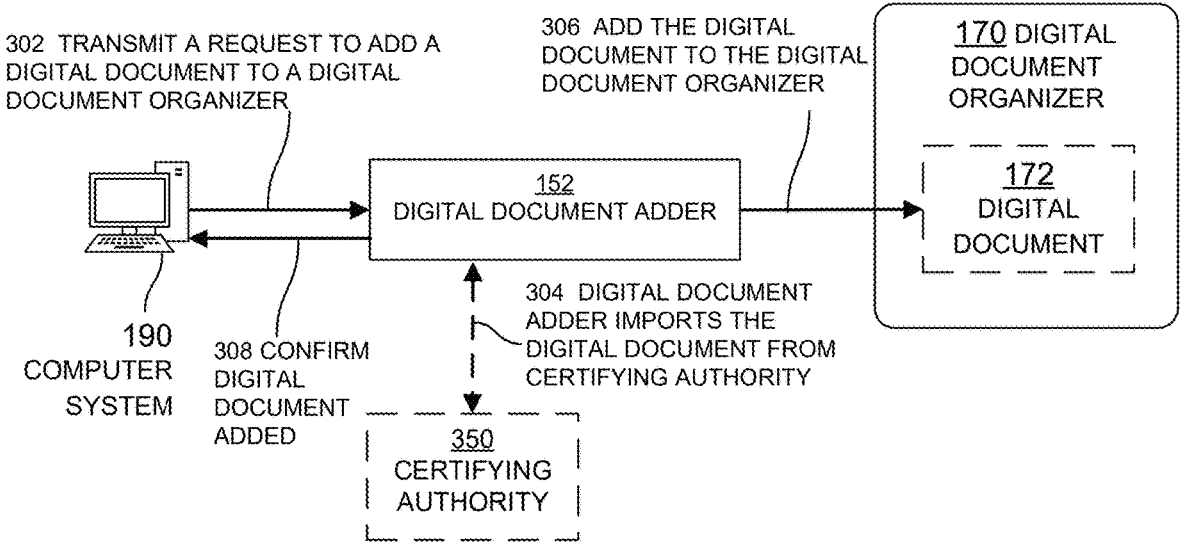
FIG. 3 is a diagram showing operations for adding a digital document to a digital document organizer, according to embodiments.

FIG. 3 is a diagram showing operations for adding a digital document to a digital document organizer, according to embodiments. The operations shown in the diagram may be performed when a user of the OSP operating the computer system 190 submits a request to the OSP to add a digital document 172 to the user's digital document organizer 170 (e.g., through a GUI of the OSP). A digital document 172 may be a digital representation of a physical document or other collection of information/evidence that serves as an official record. For example, a digital document 172 may represent a certification, a license, an approval letter, a proof of insurance, a contract, a tax exemption certificate, or the like. In an embodiment, the digital document 172 represents a certification issued by a certifying authority 350. A certifying authority 350 may be an entity that is authorized to issue certifications to organizations or individuals. For example, the digital document 172 may represent a tax exemption certificate granted by a tax authority. Sellers are often required to charge sales tax on all transactions subject to tax except when a jurisdiction's rules allow for the sale to be made tax-exempt. A tax exemption certificate is a form that can be presented by an exempt organization or individual to the seller when making a tax-exempt purchase.

A digital document 172 may take the form of a Portable Document Format (PDF) file, an image file, a text file, an extensible Markup Language (XML) file, a JavaScript Object Notation (JSON) file, and/or a Microsoft Word file. Of course, it should be understood that the digital document 172 may take other forms than listed above.

At operation 302, the computer system 190 transmits a request to add the digital document 172 to the user's digital document adder 152. The request may include the digital document 172 to be added (e.g., as part of the payload of the request) or indicate that the digital document 172 is to be imported from a certifying authority 350 (or other official source of the digital document 172). In the latter case, the request may include credentials provided by the user that will allow the digital document adder 152 to import the digital document 172 from the certifying authority 350 on behalf of the user. If the request indicates that the digital document 172 is to be imported from the certifying authority 350, then at operation 304, the digital document adder 152 imports the digital document 172 from the certifying authority 350 (e.g., using the user-provided credentials). This may be considered a "pull" mechanism where the OSP "pulls" the digital document 172 from the certifying authority 350.

Regardless of how the digital document adder 152 obtains the digital document 172, at operation 306, the digital document adder 152 adds the digital document 172 to the user's digital document organizer 170. If the digital document 172 is successfully added to the user's digital document organizer 170, at operation 308, the digital document adder 152 transmits a confirmation to the computer system 190 indicating that the digital document 172 has been added to the user's digital document organizer 170.

Figure 4A:
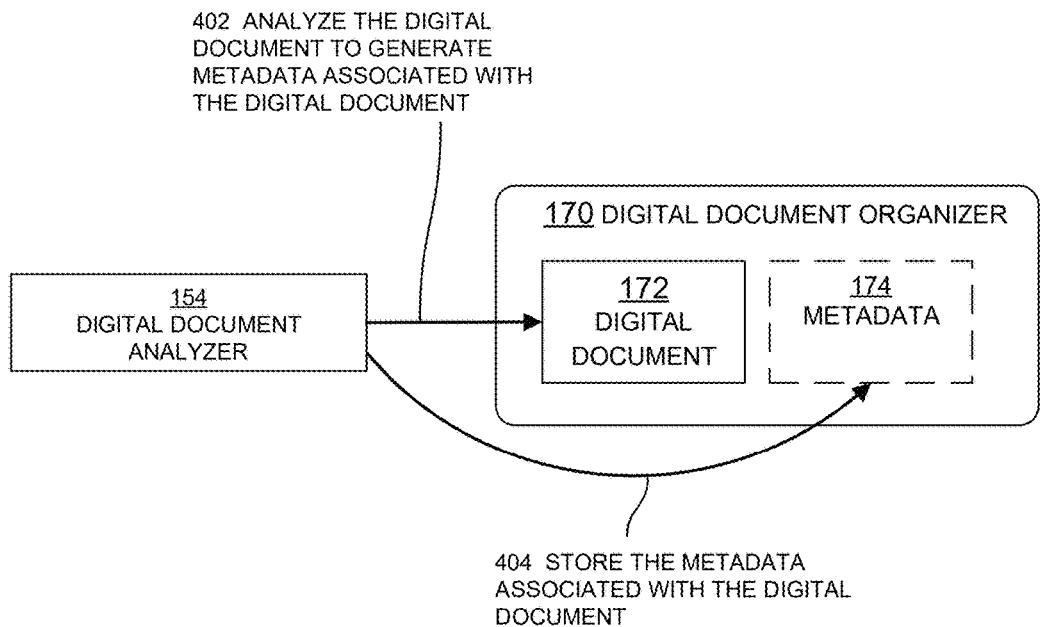
FIG. 4A is a diagram showing operations for generating metadata associated with a digital document, according to embodiments.

FIG. 4A is a diagram showing operations for generating metadata associated with a digital document, according to embodiments. The operations shown in the diagram may be performed at or around the time a digital document 172 is added to a digital document organizer 170. At operation 402, the digital document analyzer 154 analyzes the digital document 172 to generate metadata 174 associated with the digital document 172. The metadata 174 may include information extracted from the digital document 172, information related to the digital document 172 provided by the user of the OSP, information related to the digital document 172 provided by a certifying authority, or other information related to the digital document 172 that can otherwise be obtained by the digital document analyzer 154. For example, if the digital document 172 represents a certification, the metadata 174 may include the expiration date of the certification. Other examples of metadata 174 include information regarding the certifying authority that issued the underlying document, the user's contact information, document type information (e.g., information to indicate that the underlying document is showing proof of insurance), and credential information (e.g., license number). In an embodiment, the digital document analyzer 154 uses optical character recognition (OCR) techniques to identify and extract relevant information from the digital document 172 and uses the information extracted from the digital document 172 to generate the metadata 174. In an embodiment, the digital document analyzer 154 has pre-knowledge of the structure/organization of various types of documents. If the digital document analyzer 154 determines that a digital document 172 represents a particular type of document (e.g., a tax exemption certificate), then the digital document analyzer 154 may leverage the knowledge that it has about the structure/organization of the particular document type (e.g., knowledge of where certain fields of the document are located and how certain information is represented in the document (e.g., dates are represented in "MM/DD/YYYY" format)) to identify and extract the relevant information from the digital document 172. At operation 404, the digital document analyzer 154 stores the metadata 174 associated with the digital document 172 in the digital document organizer 170. As will be described in additional detail herein, the metadata 174 associated with the digital document 172 may be used to generate notifications associated with the digital document.

Figure 4B:
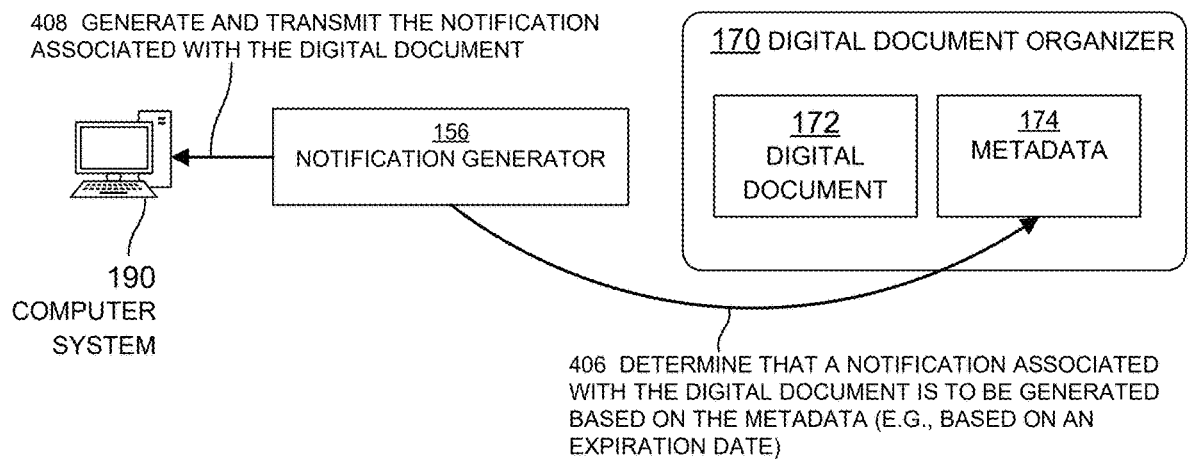
FIG. 4B is a diagram showing operations for generating a notification associated with a digital document, according to embodiments.

FIG. 4B is a diagram showing operations for generating a notification associated with a digital document, according to embodiments. At operation 406, the notification generator 156 determines that a notification associated with the digital document 172 is to be generated based on the metadata 174. For example, the notification generator 156 may determine that a notification associated with the digital document 172 is to be generated because an expiration date associated with the digital document 172 is approaching (e.g., the expiration date is less than threshold number of days away from the current date). At operation 408, the notification generator 156 generates the notification associated with the digital document (e.g., indicating that the expiration date is approaching) and transmits the notification to the computer system 190. The notification may be in the form of an email message to the user, a text message to the user, a telephone call to the user (e.g., a voice message), and/or a notification displayed in a GUI of the OSP. Of course, it should be understood that the notification may take other forms than listed above. In an embodiment, the notification includes a link that the user can access to automatically renew a certification. In an embodiment, the OSP is able to renew the certification on behalf of the user (e.g., by contacting the certifying authority on behalf of the user).

Figure 4C:
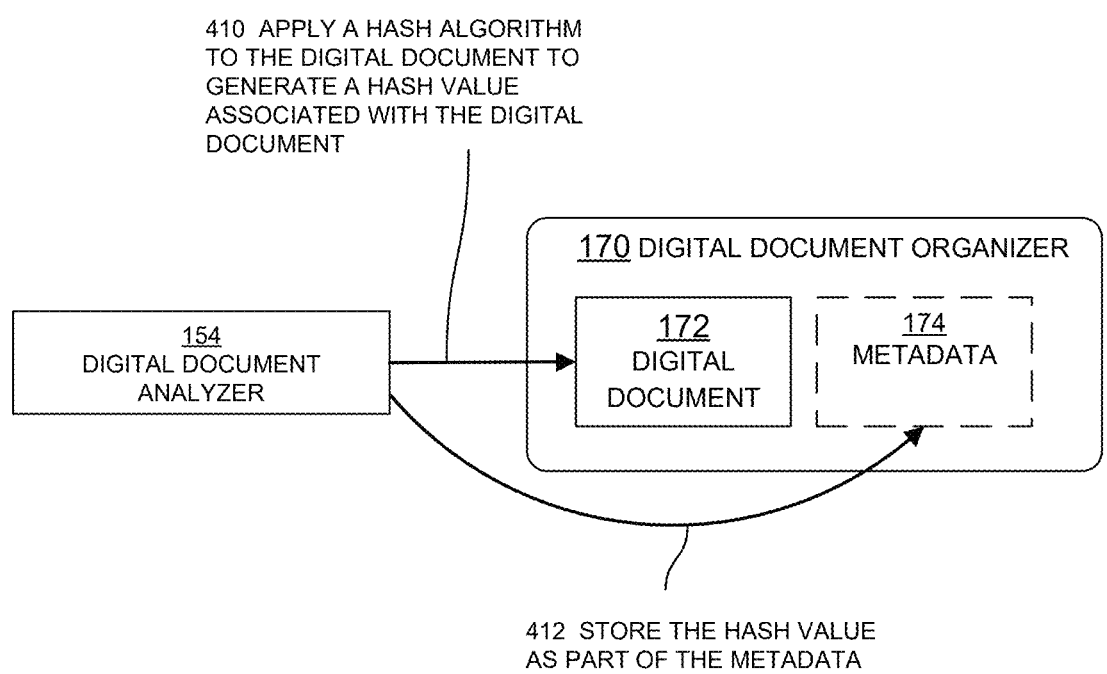
FIG. 4C is a diagram showing operations for generating and storing a hash value associated with a digital document, according to embodiments.

FIG. 4C is a diagram showing operations for generating and storing a hash value associated with a digital document, according to embodiments. The operations shown in the diagram may be performed at or around the time a digital document 172 is added to a digital document organizer 170. At operation 410, the digital document analyzer 154 applies a hash algorithm to the digital document 172 to generate a hash value associated with the digital document 172. Examples of hash algorithms that can be used include MD5 message-digest algorithm and Secure Hash Algorithm (e.g., SHA-1 and SHA-2), although it should be understood that other types of hash algorithms can be used. At operation 412, the digital document analyzer 154 stores the hash value as part of the metadata 174 associated with the digital document 172. As will be described in additional detail herein, the stored hash value may be used by the digital document retriever 158 to ensure that the digital document 172 has not been tampered with.

Figure 5:
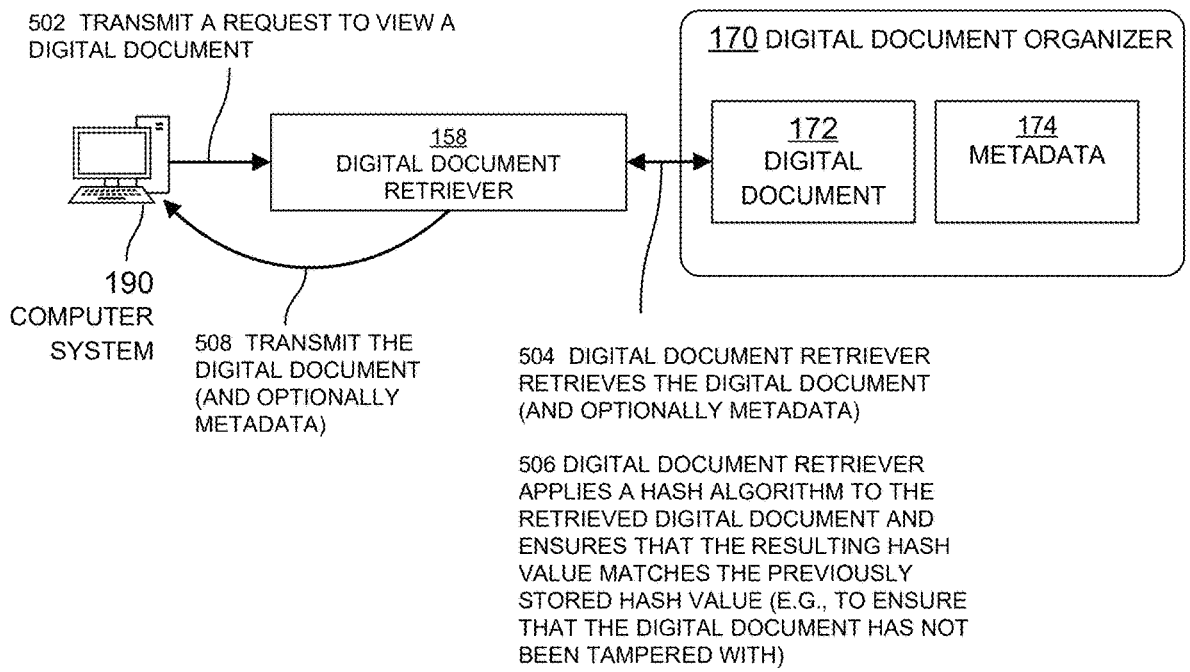
FIG. 5 is a diagram showing operations for retrieving a digital document, according to embodiments.

FIG. 5 is a diagram showing operations for retrieving a digital document, according to embodiments. The operations shown in the diagram may be performed when a user of the OSP operating the computer system 190 submits a request to the OSP to view a digital document 172 in the user's digital document organizer 170 (e.g., through a GUI of the OSP). At operation 502, the computer system 190 transmits a request to the digital document retriever 158 to view the digital document 172. At operation 504, the digital document retriever 158 retrieves the requested digital document 172 (e.g., from a database that stores the digital document 172) and possibly metadata 174 associated with that digital document 172 (e.g., which may be metadata 174 generated by the digital document analyzer 154). In an embodiment, at operation 506, the digital document retriever 158 applies a hash algorithm (e.g., the same hash algorithm applied as part of operation 410 of FIG. 4C) to the retrieved digital document 172 and ensures that the resulting hash value matches the previously stored hash value for the digital document 172 (e.g., the hash value stored as part of operation 412 of FIG. 4C) to ensure that the digital document 172 has not been tampered with. If the hash value generated at the time of retrieving the digital document 172 is different from the hash value that was previously stored at or around the time that the digital document 172 was added to the digital document organizer 170 then this indicates that the digital document 172 may have been tampered with sometime after being added to the digital document organizer 170. Thus, in an embodiment, the digital document retriever 158 does not transmit the digital document 172 (or its associated metadata 174) to the computer system 190 if the hash values do not match. If the hash values match, at operation 508, the digital document retriever 158 transmits the retrieved digital document 172 and possibly the metadata 174 associated with the digital document 172 to the computer system 190. In an embodiment, the digital document 172 is transmitted (e.g., over a network) in encrypted form (e.g., by using HTTPS). The computer system 190 may display the digital document 172 and possibly the metadata 174 associated with the digital document 172 to the user.

Figure 6A:
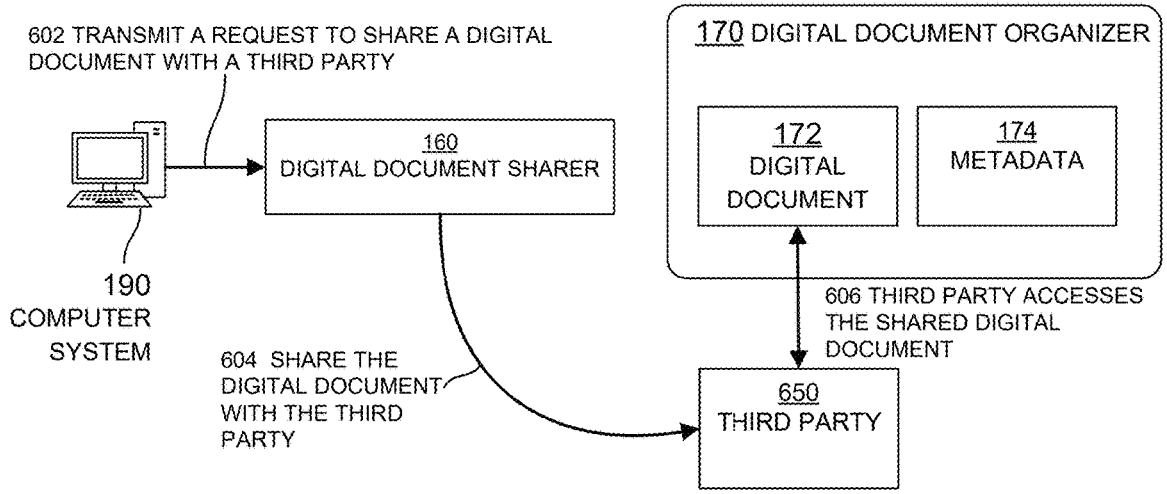
FIG. 6A is a diagram showing operations for sharing a digital document with a third party, according to embodiments.

FIG. 6A is a diagram showing operations for sharing a digital document with a third party, according to embodiments. The operations shown in the diagram may be performed when a user of the OSP operating the computer system 190 submits a request to the OSP to share a digital document 172 (and possibly one or more aspects of metadata 174 associated with that digital document 172) from the user's digital document organizer 170 with a third party 650 (e.g., through a GUI of the OSP). The third party may be an organization or an individual. At operation 602, the computer system 190 transmits a request to the digital document sharer 160 to share the digital document 172 with the third party 650. The third party 650 may or may not be a user of the OSP 198. The request to share the digital document 172 may include the third party's email address, the third party's OSP user ID (e.g., if the third party is a user of the OSP), or other type of information identifying the third party 650. At operation 604, the digital document sharer 160 shares the digital document 172 with the third party 650. In an embodiment, the digital document sharer 160 shares the digital document 172 with the third party 650 by generating a link (e.g., a uniform resource locator (URL)) that is usable by the third party to access the digital document 172 and transmits the link to the third party 650 such that the third party 650 can use the link to access the digital document 172. As a result, at operation 606, the third party 650 is able to access the digital document 172.

Figure 6B:
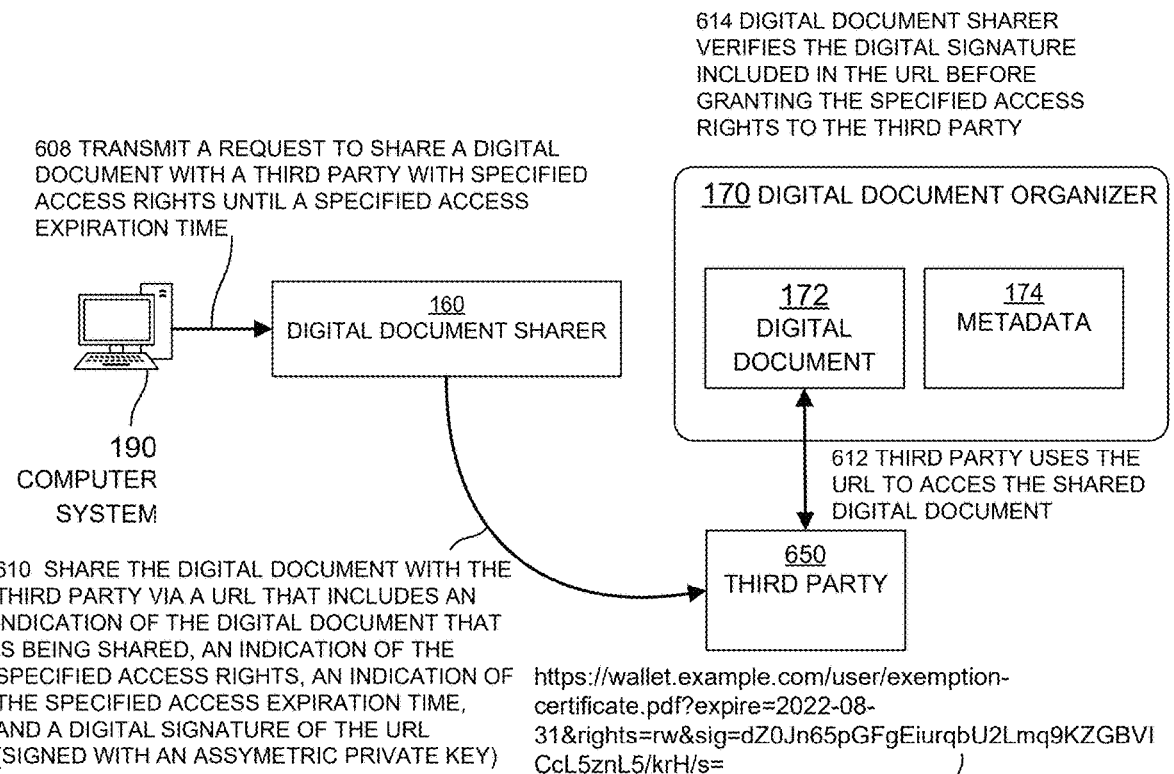
FIG. 6B is a diagram showing operations for sharing a digital document with a third party with specified access rights until a specified access expiration date/time, according to embodiments.

FIG. 6B is a diagram showing operations for sharing a digital document with a third party with specified access rights until a specified access expiration date/time, according to embodiments. The operations shown in the diagram may be performed when a user of the OSP operating the computer system 190 submits a request to the OSP to share a digital document 172 (and possibly one or more aspects of metadata 174 associated with that digital document 172) from the user's digital document organizer 170 with a third party 650 with specified access rights until a specified access expiration date/time (e.g., through a GUI of the OSP). At operation 608, the computer system 190 transmits a request to the digital document sharer 160 to share the digital document 172 with the third party 650 with specified access rights (e.g., read only privileges or read and write privileges) until a specified access expiration date/time (e.g., for the next 24 hours). At operation 610, the digital document sharer 160 shares the digital document 172 with the third party 650 via a uniform resource locator (URL) that includes an indication of the digital document that is being shared, an indication of the specified access rights, an indication of the specified access expiration date/time, and a digital signature of the URL (e.g., that is signed with a private key of the OSP). In an embodiment, the digital document sharer 160 generates the digital signature of the URL by performing a base64 encoding of the hash of the URL path and query string in alphabetical order. At operation 612, the third party 650 uses the URL to access the shared digital document 172. At operation 614, the digital document sharer 160 verifies the digital signature included in the URL and verifies that access to the digital document 172 has not expired (e.g., by checking that the current time is before the specified access expiration date/time) before granting the specified access rights to the third party 650. In an embodiment, the digital document sharer 160 verifies the digital signature included in the URL by performing the same operations that were used to generate the digital signature and ensuring that the resulting digital signature matches the digital signature included in the URL (which means that the parameter values in the query string have not been altered).

As an example, the digital document sharer 160 may generate a URL 611: "https://wallet.example.com/user/exemption-certificate.pdf?expire=2022-08-31&rights=rw&sig=dZ0Jn65pGFgEiurqbU2Lmq9KZGB-VICcL5znL5/krH/s="

This example URL 611 would provide the third party 650 with read and write access ("rights=rw"–"r" stands for read and "w" stands for write) to the "exemption-certificate.pdf" digital document until Aug. 31, 2022 ("expire=2022-08-31").

The digital document sharer 160 may generate the digital signature using the following logic:
    base64_encode(HASH(OspSSLCertificate, "exemption-certificate.pdf?expire=2022-08-31&rights=rw"), which returns the string "dZ0Jn65pGFgEiurqbU2Lmq9KZGBVICcL5znL5/krH/s="

In the above logic, "base64_encode" is a base 64 encoding function, "HASH" is a hash function, and "OspSSLCerticiate" is the OSP's Secure Sockets Layer (SSL) certificate (which may include the OSP's private key).

Figure 7:
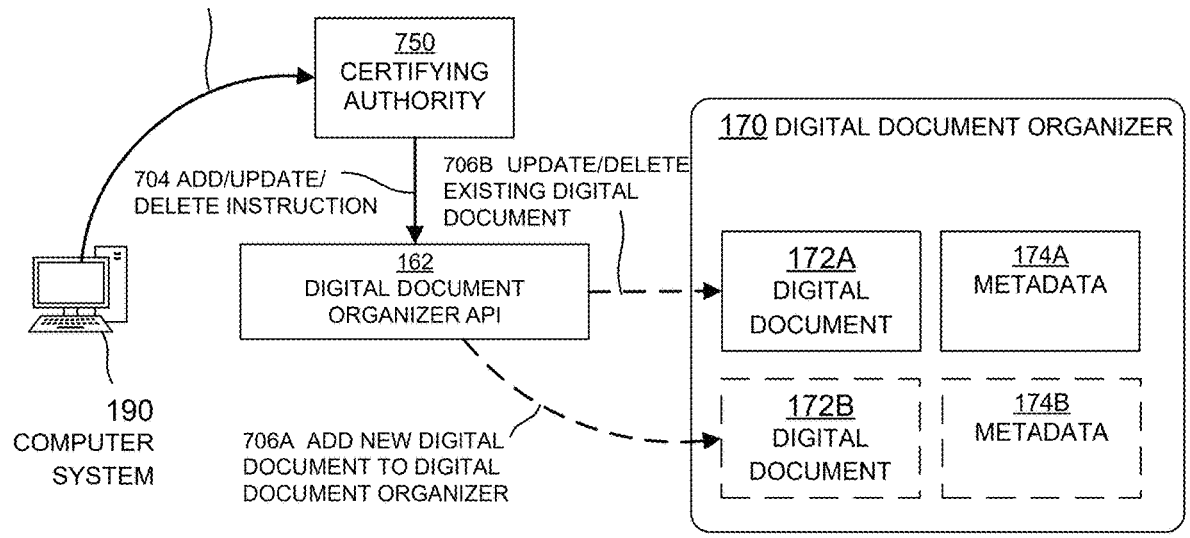
FIG. 7 is a diagram showing operations for allowing a certifying authority to add, update, and/or delete digital documents, according to embodiments.

FIG. 7 is a diagram showing operations for allowing a certifying authority to add, update, and/or delete digital documents, according to embodiments. The operations shown in the diagram may be performed when a user of the OSP operating the computer system 190 authorizes the certifying authority 750 to add, update, and/or delete digital documents 172 in the user's digital document organizer 170 (e.g., through a GUI of the certifying authority 750). At operation 702, the computer system 190 authorizes the certifying authority 750 to add, update, and/or delete digital documents in the user's digital document organizer 170. As part of authorizing the certifying authority 750, the computer system 190 may provide the location/ID of the user's digital document organizer 170 to the certifying authority 750. At operation 704, the certifying authority 750 transmits an instruction to the digital document organizer API 162 to add, update, and/or delete a digital document 172 in the user's digital document organizer 170. The digital document organizer API 162 may be an API that the OSP exposes towards the certifying authority 750. In an embodiment, the API is a REST API. If the instruction is an instruction to add a new digital document 172B to the user's digital document organizer 170, then at operation 706A, the digital document organizer API 162 adds the new digital document 172B to the user's digital document organizer 170 (metadata 174 associated with the digital document 172B may also be generated (e.g., by the digital document analyzer 154) and added to the user's digital document organizer 170). Otherwise, if the instruction is an instruction to update/replace an existing digital document 172A in the user's digital document organizer 170 or delete an existing digital document 172A from the user's digital document organizer 170, then at operation 706B, the digital document organizer API 162 updates/replaces or deletes the existing digital document 172A (and possibly its associated metadata 174A). This may be considered a "push" mechanism where the certifying authority 750 "pushes" a digital document 172 (or updates thereto) to the OSP.

For example, a user of the OSP may take a Project Management Professional® exam offered by the Project Management Institute (PMI) and provide the location/ID of the user's digital document organizer 170 to PMI. Upon passing the exam, PMI could use the digital document organizer API 162 to automatically add a digital document 172 representing the certification (indicating that the user passed the exam) to the user's digital document organizer 170 and update/delete the digital document 172 if the user's certification status changes.

Figure 8:
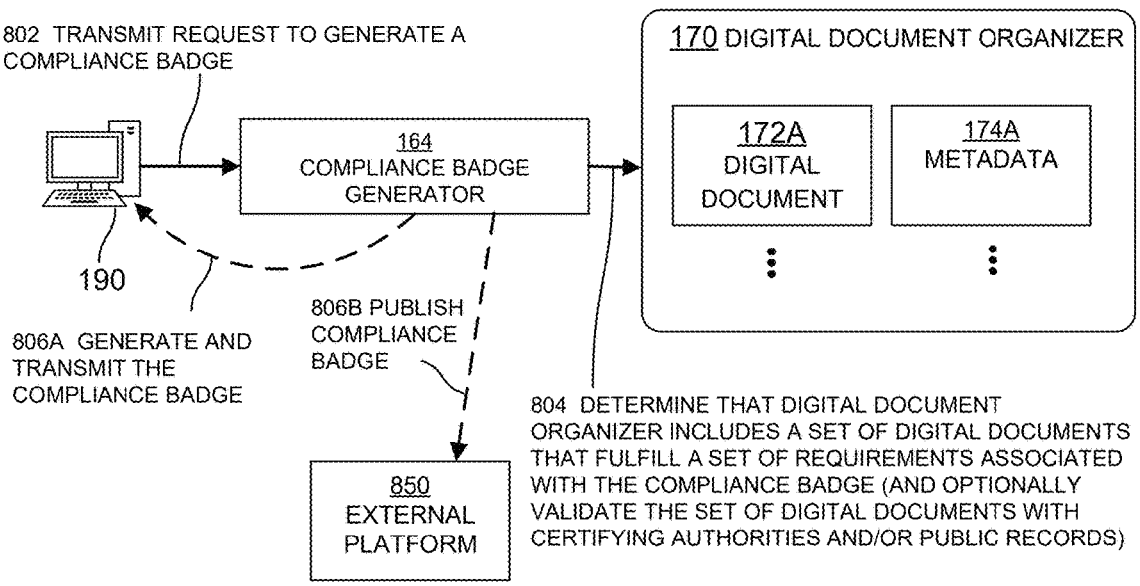
FIG. 8 is a diagram showing operations for generating a compliance badge, according to embodiments.

FIG. 8 is a diagram showing operations for generating a compliance badge, according to embodiments. The operations shown in the diagram may be performed when a user of the OSP operating the computer system 190 submits a request to the OSP to generate a compliance badge (e.g., through a GUI of the OSP). A compliance badge may be a certification issued by the OSP indicating that a user of the OSP (or the entity that the user represents) has the appropriate credentials and/or qualifications to operate in a specific industry and/or region. A compliance badge may be associated with a set of requirements in terms of the types of digital documents 172 (and possibly one or more aspects of metadata 174 associated with that digital document 172) that a user must have in their digital document organizer 170 to be issued the compliance badge. For example, a compliance badge for a plumbing service may require that a user have digital documents representing a plumber journeyman license, a plumbing license for a particular state, and a proof of insurance in their digital document organizer 170. Having a compliance badge issued by the OSP may help increase customer confidence in the business.

At operation 802, the computer system 190 transmits a request to the compliance badge generator 164 to generate a compliance badge. At operation 804, the compliance badge generator 164 determines whether the digital document organizer 170 includes a set of digital documents (and possibly metadata) that fulfill a set of requirements associated with the compliance badge (and optionally validates the set of digital documents with certifying authorities and/or public records (e.g., to ensure that licenses are valid and have not expired)). If the compliance badge generator 164 determines that the digital document organizer 170 includes a set of digital documents that fulfill the set of requirements associated with the compliance badge, at operation 806A, the compliance badge generator 164 generates the compliance badge and transmits the compliance badge to the computer system 190. The user may provide the compliance badge to customers or potential customers to show that the user has the appropriate credentials and/or qualifications. The customers or potential customers may verify the compliance badge with the OSP and/or obtain more information about the compliance badge from the OSP. Additionally or alternatively to transmitting the compliance badge to the computer system 190, at operation 806B, the compliance badge generator 164 publishes the compliance badge to an external platform 850. The external platform 850 may be, for example, an online business review/rating site or an online business directory such as Yelp®, Angie's List®, Houzz®, or Home Advisor®.

Figure 9A:
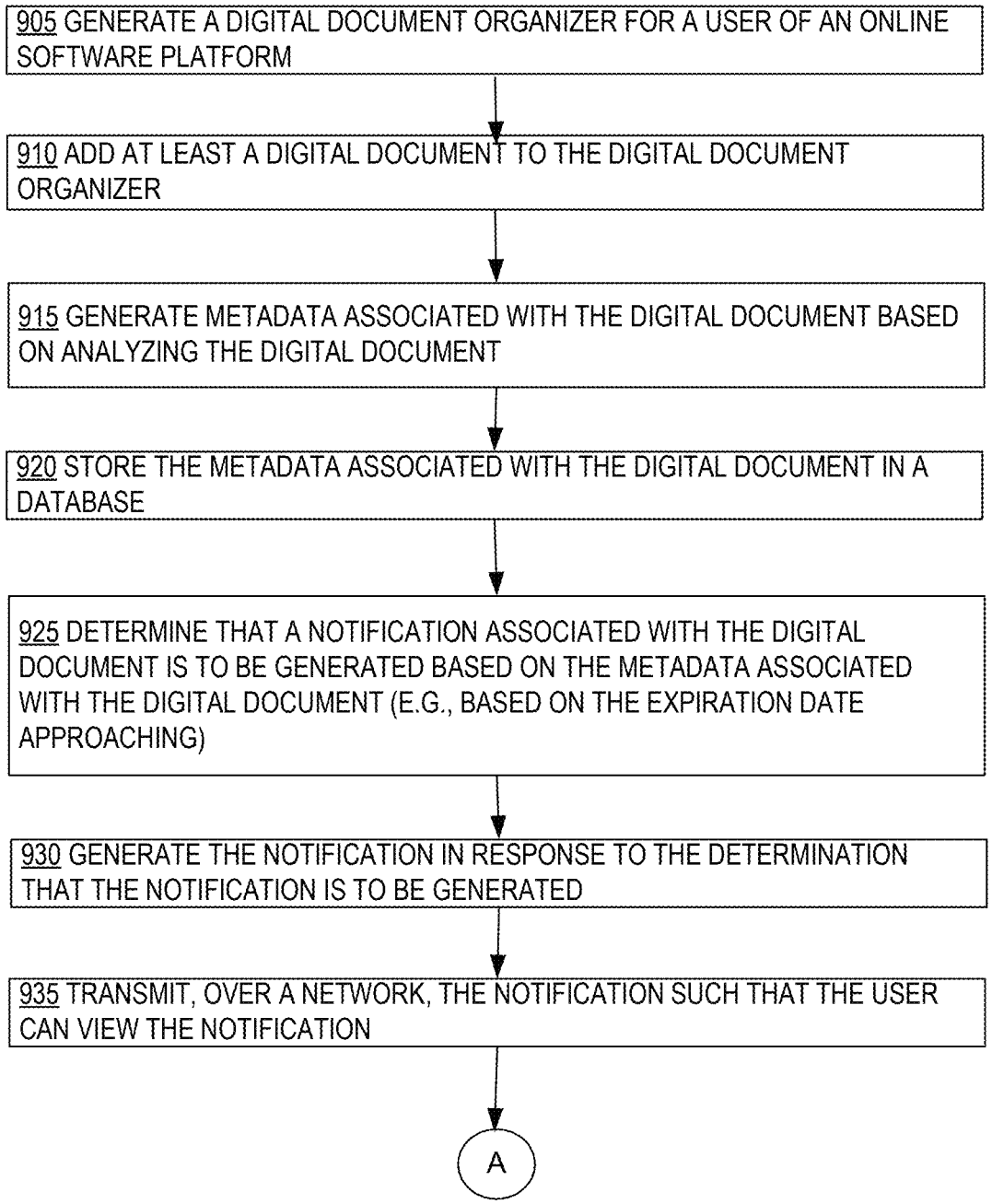
FIG. 9A and FIG. 9B are flowcharts describing methods, according to embodiments.
Figure 9B:
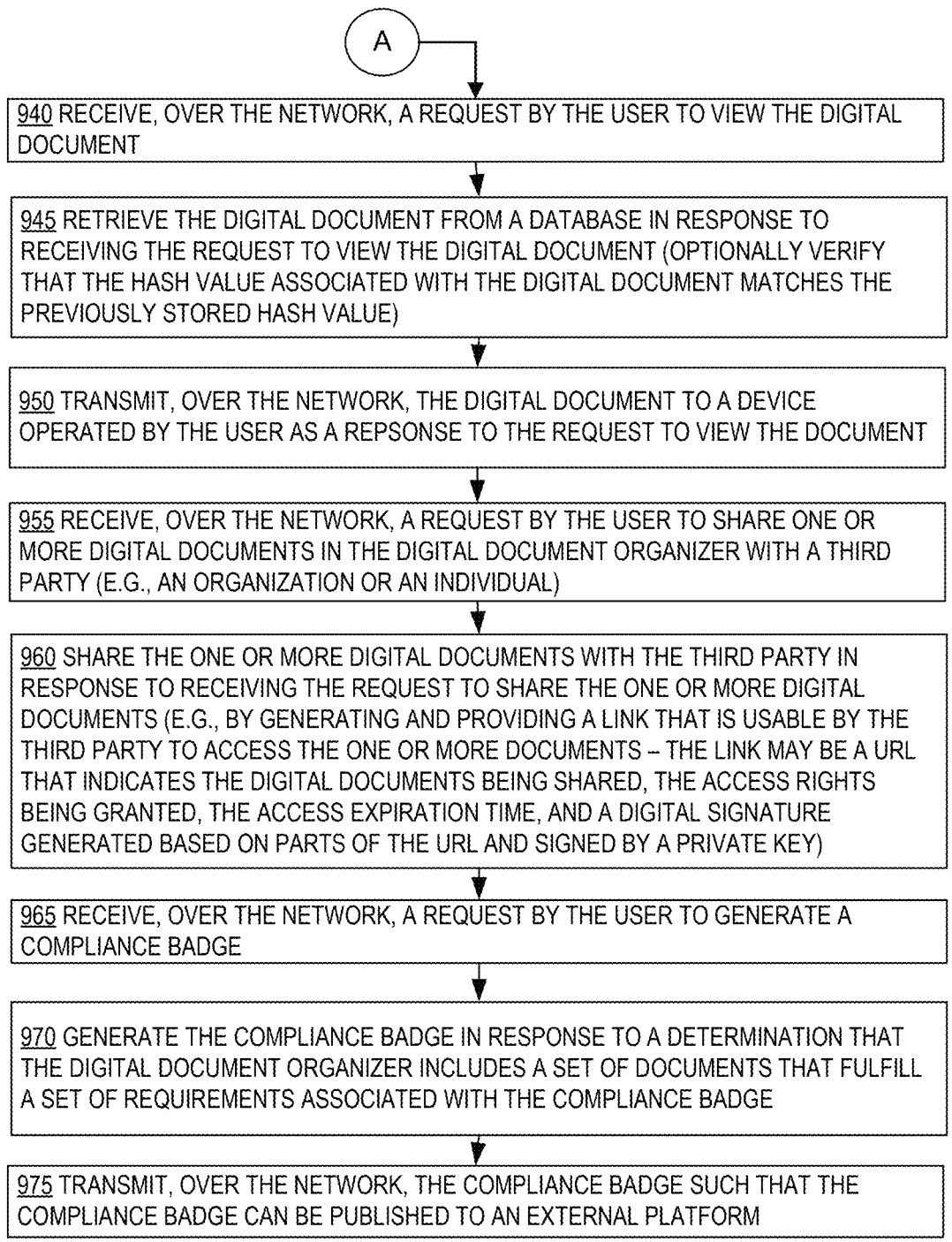

FIG. 9A and FIG. 9B are flowcharts 900 describing methods, according to embodiments. While the flow diagrams in the figures show a particular order of operations performed by certain embodiments, it should be understood that such order is provided as an example and that other embodiments may perform the operations in a different order, combine certain operations, overlap certain operations, etc.

At operation 905, the OSP computer system generates a digital document organizer for a user of the OSP.

At operation 910, the OSP computer system adds at least a digital document to the digital document organizer. In an embodiment, the digital document represents, but is not limited to, any one of: a certification, a license, an approval letter, a proof of insurance, and a contract.

In an embodiment, the OSP computer system receives, over a network, a request by the user to add the digital document to the digital document organizer, wherein the digital document is added to the digital document organizer in response to receiving the request to add the respective digital document to the digital document organizer. In an embodiment, the request to add the digital document to the digital document organizer includes the digital document. In an embodiment, the request to add the digital document to the digital document organizer indicates that the digital document is to be imported from a certifying authority. In such an embodiment, the OSP computer system may import the digital document from the certifying authority in response to receiving the request to add the digital document to the digital document organizer. In an embodiment, the OSP computer system receives, via an API exposed by the OSP towards the certifying authority, the digital document and an identifier of the digital document organizer, wherein the digital document is added to the digital document organizer in response to receiving the digital document and the identifier of the digital document organizer via the API. Thus, the digital document may be obtained directly from the user of the OSP (e.g., in the request payload), pulled/imported from the certifying authority, or pushed by the certifying authority to the OSP via an API exposed by the OSP towards the certifying authority. In an embodiment, the OSP computer system receives, via the API exposed by the OSP towards the certifying authority, an update to the digital document and updates the digital document in response to receiving the update via the API.

At operation 915, the OSP computer system generates metadata associated with the digital document based on analyzing the digital document. In an embodiment, the metadata includes an expiration date associated with the digital document. In an embodiment, the metadata includes a hash value associated with the digital document that is generated by applying a hash algorithm to the digital document when the digital document is added to the digital document organizer.

At operation 920, the OSP computer system stores the metadata associated with the digital document in a database.

At operation 925, the OSP computer system determines that a notification associated with the digital document is to be generated based on the metadata associated with the digital document. In an embodiment, the determination that the notification associated with the digital document is to be generated is based on a determination that an expiration date associated with the digital document (e.g., which may be included in the metadata associated with the digital document) is less than a threshold number of days away from the current date.

At operation 930, the OSP computer system generates the notification in response to the determination that the notification is to be generated.

At operation 935, the OSP computer system transmits, over a network, the notification such that the user can view the notification.

Now referring to FIG. 9B, at operation 940, the OSP computer system receives, over the network, a request by the user to view the digital document.

At operation 945, the OSP computer system retrieves the digital document from a database in response to receiving the request to view the digital document.

At operation 950, the OSP computer system transmits, over the network, the digital document to a device operated by the user as a response to the request to view the digital document. In an embodiment, the OSP computer system applies a hash algorithm to the retrieved digital document and ensures that the resulting hash value matches a previously stored hash value for the digital document (e.g., to ensure that the digital document has not been tampered with) before transmitting the digital document to the device operated by the user.

At operation 955, the OSP computer system receives, over the network, a request by the user to share one or more digital documents in the digital document organizer with a third party (where the third party may be an organization or an individual).

At operation 960, the OSP computer system shares the one or more digital documents with the third party in response to receiving the request to share the one or more digital documents with the third party. In an embodiment, the OSP computer system shares the one or more digital documents by generating a link that is usable by the third party to access the one or more documents and transmitting, over the network, the link to the third party such that the third party can use the link to access the one or more digital documents. In an embodiment, the link is a URL that includes a query string, wherein the query string includes an indication of the one or more digital documents being shared, an indication of access rights being granted, an indication of an access expiration date/time, and a digital signature that was generated based on parts of the query string and signed by a private key (a private key of the OSP). In such an embodiment, when the OSP computer system receives a request to access the one or more documents via the URL, the OSP computer system may verify the digital signature included in the URL using the private key, verify that the access rights have not expired based on the access expiration date/time, and grant the access rights to the one or more documents in response to successfully verifying the digital signature and verifying that the access rights have not expired.

At operation 965, the OSP computer system receives, over the network, a request by the user to generate a compliance badge.

At operation 970, the OSP computer system generates the compliance badge in response to a determination that the digital document organizer includes a set of documents that fulfill a set of requirements associated with the compliance badge.

At operation 970, the OSP computer system transmits, over the network, the compliance badge such that the compliance badge can be published to an external platform.

Figure 10:
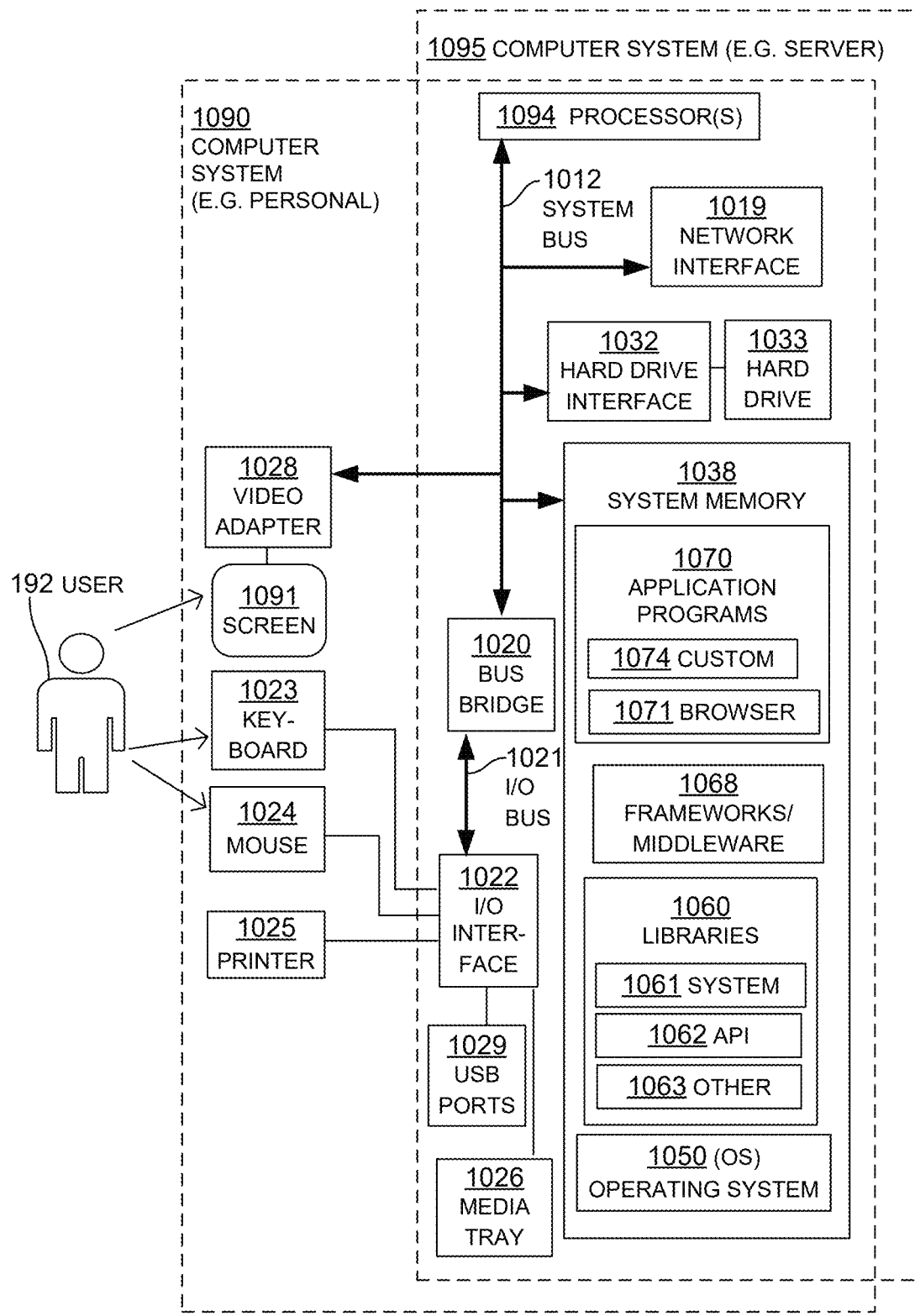
FIG. 10 shows details for example computer systems, according to embodiments.

FIG. 10 shows details for example computer systems, according to embodiments. The computer system 1095 may be a server, while the computer system 1090 may be a personal device, such as a personal computer, a desktop computer, a personal computing device such as a laptop computer, a tablet computer, a mobile phone, and so on. Either type may be used for the OSP computer system 195 and computer system 190 of FIG. 1, and/or a computer system that is part of OPF 189.

The computer system 1095 and the computer system 1090 have similarities, which FIG. 10 exploits for purposes of economy in this document. It will be understood, however, that a component in the computer system 1095 may be implemented differently than the same component in the computer system 1090. For instance, a memory in a server may be larger than a memory in a personal computer, and so on. Similarly, custom application programs 1074 that implement embodiments may be different, and so on.

The computer system 1095 includes one or more processors 1094. The processor(s) 1094 are one or more physical circuits that manipulate physical quantities representing data values. The manipulation can be according to control signals, which can be known as commands, op codes, machine code, etc. The manipulation can produce corresponding output signals that are applied to operate a machine. As such, one or more processors 1094 may, for example, include a Central Processing Unit (CPU), a Reduced Instruction Set Computing (RISC) processor, a Complex Instruction Set Computing (CISC) processor, a Graphics Processing Unit (GPU), a Digital Signal Processor (DSP), a Field-Programmable Gate Array (FPGA), an Application Specific Integrated Circuit (ASIC), any combination of these, and so on. A processor may further be a multi-core processor having two or more independent processors that execute instructions. Such independent processors are sometimes called "cores".

A hardware component such as a processor may also include programmable logic or circuitry that is temporarily configured by software to perform certain operations. For example, a hardware component may include software executed by a general-purpose processor or another type of programmable processor. Once configured by such software, hardware components become specific machines, or specific components of a machine, uniquely tailored to perform the configured functions and are no longer general-purpose processors. It will be appreciated that the decision to implement a hardware component mechanically, in dedicated and permanently configured circuitry, or in temporarily configured circuitry (e.g., configured by software) may be driven by cost and time considerations.

As used herein, a "component" may refer to a device, physical entity or logic having boundaries defined by function or subroutine calls, branch points, Application Programming Interfaces (APIs), or other technologies that provide for the partitioning or modularization of particular processing or control functions. Components may be combined via their interfaces with other components to carry out a machine process. A component may be a packaged functional hardware unit designed for use with other components and a part of a program that usually performs a particular function of related functions. Components may constitute either software components (e.g., code embodied on a machine-readable medium) or hardware components. The hardware components depicted in the computer system 1095, or the computer system 1090, are not intended to be exhaustive. Rather, they are representative, for highlighting essential components that can be used with embodiments.

The computer system 1095 also includes a system bus 1012 that is coupled to the processor(s) 1094. The system bus 1012 can be used by the processor(s) 1094 to control and/or communicate with other components of the computer system 1095.

The computer system 1095 additionally includes a network interface 1019 that is coupled to system bus 1012. Network interface 1019 can be used to access a communications network, such as the network 188. Network interface 1019 can be implemented by a hardware network interface, such as a Network Interface Card (NIC), wireless communication components, cellular communication components, Near Field Communication (NFC) components, Bluetooth® components such as Bluetooth® Low Energy, Wi-Fi® components, etc. Of course, such a hardware network interface may have its own software, and so on.

The computer system 1095 also includes various memory components. These memory components include memory components shown separately in the computer system 1095, plus cache memory within the processor(s) 1094. Accordingly, these memory components are examples of non-transitory machine-readable media. The memory components shown separately in the computer system 1095 are variously coupled, directly or indirectly, with the processor(s) 1094. The coupling in this example is via the system bus 1012.

Instructions for performing any of the methods or functions described in this document may be stored, completely or partially, within the memory components of the computer system 1095, etc. Therefore, one or more of these non-transitory computer-readable media can be configured to store instructions which, when executed by one or more processors 1094 of a host computer system such as the computer system 1095 or the computer system 1090, can cause the host computer system to perform operations according to embodiments. The instructions may be implemented by computer program code for carrying out operations for aspects of this document. The computer program code may be written in any combination of one or more programming languages, including an object-oriented programming language such as Java, Smalltalk or the like, and/or conventional procedural programming languages, such as the "C" programming language or similar programming languages such as C++, C Sharp, etc.

The memory components of the computer system 1095 include a non-volatile hard drive 1033. The computer system 1095 further includes a hard drive interface 1032 that is coupled to the hard drive 1033 and to the system bus 1012.

The memory components of the computer system 1095 include a system memory 1038. The system memory 1038 includes volatile memory including, but not limited to, cache memory, registers and buffers. In embodiments, data from the hard drive 1033 populates registers of the volatile memory of the system memory 1038.

In some embodiments, the system memory 1038 has a software architecture that uses a stack of layers, with each layer providing a particular functionality. In this example the layers include, starting from the bottom, an Operating System (OS) 1050, libraries 1060, frameworks/middleware 1068 and application programs 1070, which are also known as applications 1070. Other software architectures may include less, more or different layers. For example, a presentation layer may also be included. For another example, some mobile or special purpose operating systems may not provide a frameworks/middleware 1068.

The OS 1050 may manage hardware resources and provide common services. The libraries 1060 provide a common infrastructure that is used by the applications 1070 and/or other components and/or layers. The libraries 1060 provide functionality that allows other software components to perform tasks more easily than if they interfaced directly with the specific underlying functionality of the OS 1050. The libraries 1060 may include system libraries 1061, such as a C standard library. The system libraries 1061 may provide functions such as memory allocation functions, string manipulation functions, mathematical functions, and the like.

In addition, the libraries 1060 may include API libraries 1062 and other libraries 1063. The API libraries 1062 may include media libraries, such as libraries to support presentation and manipulation of various media formats such as MPREG4, H.264, MP3, AAC, AMR, JPG, and PNG. The API libraries 1062 may also include graphics libraries, for instance an OpenGL framework that may be used to render 2D and 3D in a graphic content on the screen 1091. The API libraries 1062 may further include database libraries, for instance SQLite, which may support various relational database functions. The API libraries 1062 may additionally include web libraries, for instance WebKit, which may support web browsing functionality, and also libraries for applications 1070.

The frameworks/middleware 1068 may provide a higher-level common infrastructure that may be used by the applications 1070 and/or other software components/modules. For example, the frameworks/middleware 1068 may provide various Graphic User Interface (GUI) functions, high-level resource management, high-level location services, and so forth. The frameworks/middleware 1068 may provide a broad spectrum of other APIs that may be used by the applications 1070 and/or other software components/modules, some of which may be specific to the OS 1050 or to a platform.

The application programs 1070 are also known more simply as applications and apps. One such app is a browser 1071, which is a software that can permit the user 192 to access other devices in the internet, for example while using a Graphic User Interface (GUI). The browser 1071 includes program modules and instructions that enable the computer system 1095 to exchange network messages with a network, for example using Hypertext Transfer Protocol (HTTP) messaging.

The application programs 1070 may include one or more custom applications 1074, made according to embodiments. These can be made so as to cause their host computer to perform operations according to embodiments. Of course, when implemented by software, operations according to embodiments may be implemented much faster than may be implemented by a human mind; for example, tens or hundreds of such operations may be performed per second according to embodiments, which is much faster than a human mind can do.

Other such applications 1070 may include a contacts application, a QR code reader application, a book reader application, a location application, a media application, a messaging application, and so on. Applications 1070 may be developed using the ANDROID™ or IOS™ Software Development Kit (SDK) by an entity other than the vendor of the particular platform, and may be mobile software running on a mobile operating system such as IOS™, ANDROID™, WINDOWS®-related, or other mobile operating systems. The applications 1070 may use built-in functions of the OS 1050, of the libraries 1060, and of the frameworks/middleware 1068 to create user interfaces for the user 192 to interact with.

The computer system 1095 moreover includes a bus bridge 1020 coupled to the system bus 1012. The computer system 1095 furthermore includes an input/output (I/O) bus 1021 coupled to the bus bridge 1020. The computer system 1095 also includes an I/O interface 1022 coupled to the I/O bus 1021.

For being accessed, the computer system 1095 also includes one or more Universal Serial Bus (USB) ports 1029. These can be coupled to the I/O interface 1022. The computer system 1095 further includes a media tray 1026, which may include storage devices such as CD-ROM drives, multi-media interfaces, and so on.

The computer system 1090 may include many components similar to those of the computer system 1095, as seen in FIG. 10. In addition, a number of the application programs may be more suitable for the computer system 1090 than for the computer system 1095.

The computer system 1090 further includes peripheral input/output (I/O) devices for being accessed by a user more routinely. As such, the computer system 1090 includes a screen 1091 and a video adapter 1028 to drive and/or support the screen 1091. The video adapter 1028 is coupled to the system bus 1012.

The computer system 1090 also includes a keyboard 1023, a mouse 1024, and a printer 1025. In this example, the keyboard 1023, the mouse 1024, and the printer 1025 are directly coupled to the I/O interface 1022. Sometimes this coupling is via the USB ports 1029.

In this context, "machine-readable medium" refers to a component, device or other tangible media able to store instructions and data temporarily or permanently and may include, but is not be limited to, a portable computer diskette, a thumb drive, a hard disk, random-access memory (RAM), read-only memory (ROM), buffer memory, flash memory, optical media, magnetic media, cache memory, an Erasable Programmable Read-Only Memory (EPROM), an optical fiber, a portable compact disc read-only memory (CD-ROM), an optical storage device, a magnetic storage device, or any suitable combination of the foregoing. The machine that would read such a medium includes one or more processors 1094.

The term "machine-readable medium" should be taken to include a single medium or multiple media (e.g., a centralized or distributed database, or associated caches and servers) able to store instructions that a machine such as a processor can store, erase, or read. The term "machine-readable medium" shall also be taken to include any medium, or combination of multiple media, that is capable of storing instructions (e.g., code) for execution by a machine, such that the instructions, when executed by one or more processors of the machine, cause the machine to perform any one or more of the methods described herein. Accordingly, instructions transform a general, non-programmed machine into a particular machine programmed to carry out the described and illustrated functions in the manner described.

A computer readable signal traveling from, to, and via these components may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

FIG. 11 is diagram for an operational example and use case where the digital document organizer is a digital wallet for storing, organizing, and managing digital documents representing business documents.

It will be recognized that aspects of FIG. 11 have similarities with aspects of FIG. 1. Portions of such aspects may be implemented as described for analogous aspects of FIG. 1.

An OSP computer system 1195 is shown, which is used to help customers of the OSP 1198, such as a user 1192, to store, organize, and/or manage digital documents representing their business documents in a digital wallet. Further in this example, the OSP computer system 1195 is part of an OSP 1198 that is implemented as a Software as a Service (SaaS) provider, for being accessed online by clients, such as the user 1192. Alternately, the functionality of the OSP computer system 1195 may be provided locally to a user.

The user 1192 may be standalone. The user 1192 may use a computer system 1190 that has a screen 1191. In embodiments, the user 1192 and the computer system 1190 are considered part of the entity 1193. The entity 1193 can be a business, such as a seller of items, a reseller, a buyer, and so on. In such instances, the user 1192 can be an owner, an employee, a contractor, or otherwise an agent of the entity 1193.

In a number of instances, the user 1192 and/or the entity 1193 use software applications to manage their business activities, such as sales, resource management, production, inventory management, delivery, billing, and so on. The user 1192 and/or the entity 1193 may further use accounting applications to manage purchase orders, sales invoices, refunds, payroll, accounts payable, accounts receivable, and so on. Such software applications, and more, may be used locally by the user 1192, or from an Online Processing Facility (OPF) 1189 that has been engaged for this purpose by the user 1192 and/or the entity 1193. In such use cases, the OPF 1189 can be a Mobile Payments system, a Point Of Sale (POS) system, an Accounting application, an Enterprise Resource Planning (ERP) provider, an e-commerce provider, an electronic marketplace, a Customer Relationship Management (CRM) system, and so on.

Conventional digital wallets have limited capabilities. With conventional digital wallets, the wallet items (e.g., credit cards) are managed on the end user device. If the end user gets a new device, this requires setting up a new digital wallet on the new device and importing existing wallet contents from the previous device to the new device. Also, with conventional digital wallets, the items in the digital wallet may have expiration dates but the digital wallet does not notify the user when expiration dates are approaching (e.g., this may result in the user forgetting to renew/update their credit card and trying to use a credit card that is no longer valid).

The OSP computer system 1195 may be configured to provide a digital wallet service that addresses one or more of the above-mentioned deficiencies of conventional digital wallets. The digital wallet service may allow users to store, organize, and manage digital documents representing business documents in a centralized manner. Embodiments of the digital wallet service may store digital wallets in a central location accessible over a network (e.g., the internet), and thus allows users to access their digital wallets from anywhere and with any suitable device. Unlike conventional digital wallets where the wallet items are fully digital from the start, embodiments of the digital wallet service described herein allow users to convert paper/physical documents to a digital document and store the digital document in the user's digital wallet. Also, embodiments of the digital wallet service described herein may notify users when their digital documents are about to expire.

The OSP computer system 1195 may have one or more processors and memory, for example as was described for the OSP computer system 195 of FIG. 1. The OSP computer system 1195 thus implements a wallet engine 1183 to provide a digital wallet service for users of the OSP. The wallet engine 1183 can be as described for the service engine 183.

In the implementation of FIG. 11, the OSP 1198 has a database 1194 for storing data 138 regarding digital wallets 170 for users. For example, the database 1194 may store digital wallet 170A, which includes a digital document 172A representing a tax exemption certificate and its associated metadata 174A (e.g., the document type, the expiration date, etc.), a digital document 172B representing a business license and its associated metadata 174B (e.g., the document type, the expiration date, etc.), and a digital document 172N representing a proof of insurance and its associated metadata 174N (e.g., the document type, the expiration date, etc.). The database 1194 may store additional digital wallets (e.g., for other users of the OSP 1198). The digital documents 172 in a digital wallet 170 may have been provided to the OSP by users of the OSP and/or by a set of certifying authorities 1180 such as certifying authority 1181 and 1182. It should be noted that the diagram shows a logical depiction of the data 138 for illustration purposes and is not meant to show how the data 138 is actually stored/structured/organized in the database 1194. Those skilled in the art will understand that there are various possible ways that the data 138 may be stored/structured/organized in the database 1194.

Under the control of the user 1192, the computer system 1190 may transmit a request 1184 that includes a payload 1134 to the computer system 195. The request 1184 may be a request to create a new digital wallet 170 for the user 1192, a request to add a digital document to the user's digital wallet 170, a request to view a digital document included in the user's digital wallet 170, a request to share a set of digital documents included in the user's digital wallet with a third party, or a request to generate a compliance badge. The payload 1134 of the request 1184 may vary depending on the type of request. Data may be provided to the computer system 1195 via one payload 1134 or multiple payloads. Responsive to receiving the request 1184, the computer system 195 may perform operations to fulfill the request (e.g., as described herein above) and transmit a corresponding response 1187 that includes a payload 1137 to the computer system 1190. The payload 1137 of the response 1187 may vary depending on the type of response being provided. Data may be provided to the computer system 1190 via one payload 1137 or multiple payloads.

Figure 12A:
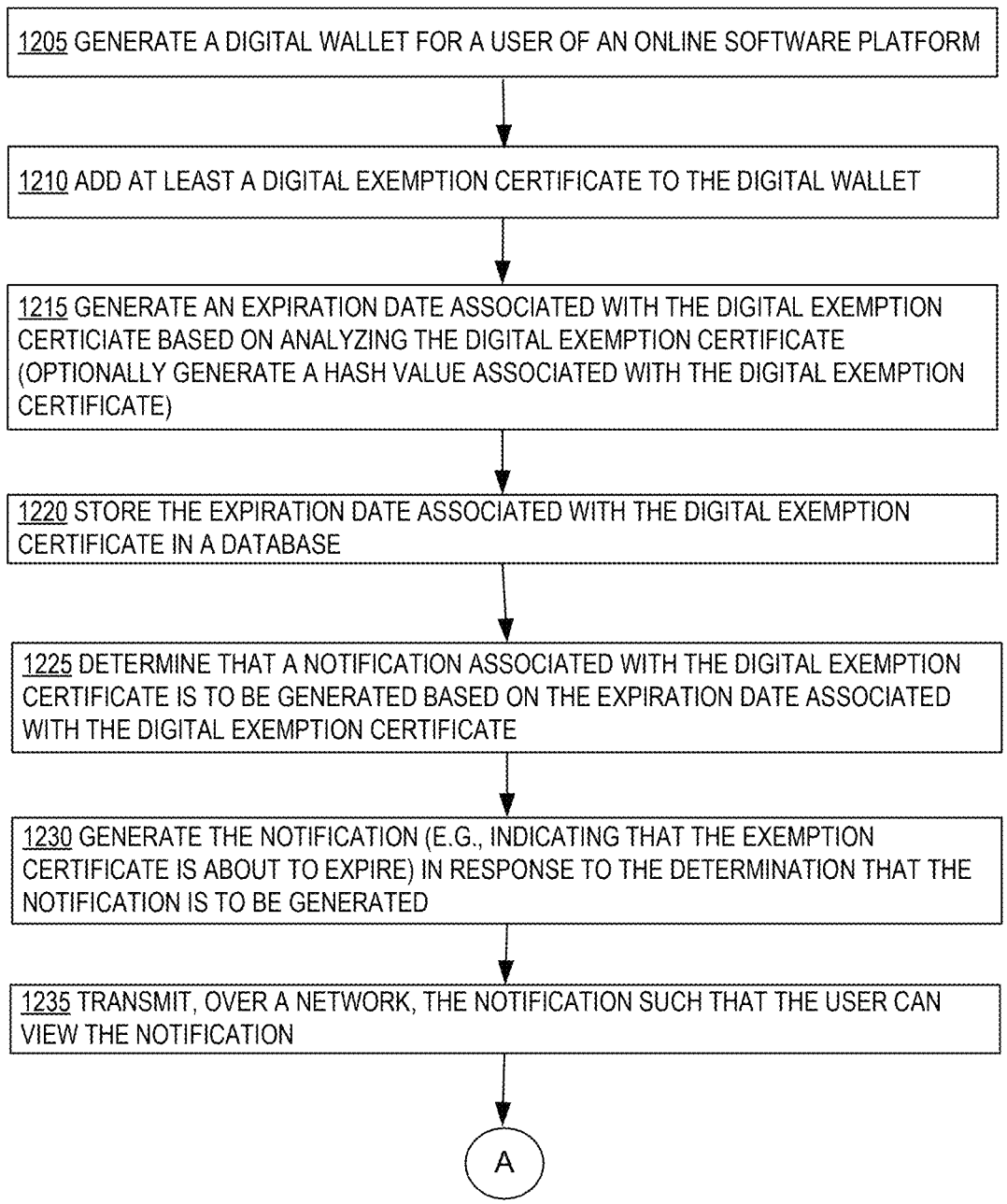
FIG. 12A, FIG. 12B, and FIG. 12C are flowcharts describing methods for a digital wallet use case, according to embodiments.
Figure 12B:
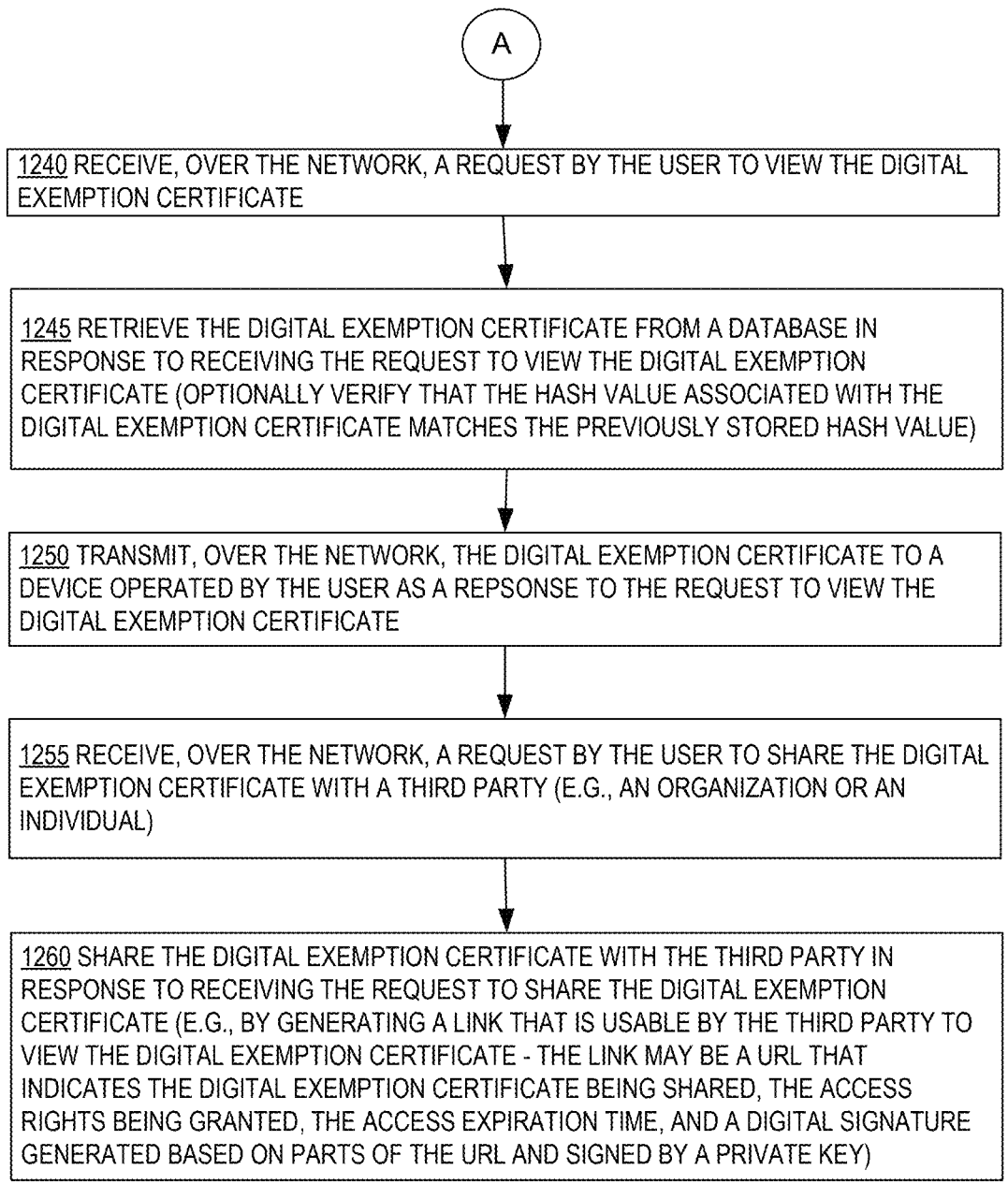
Figure 12C:
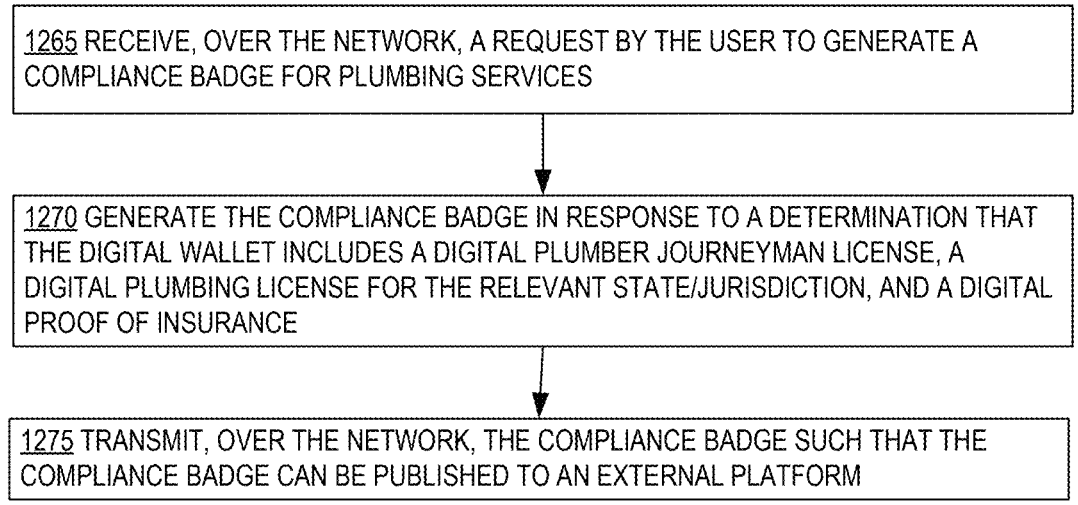

FIG. 12A, FIG. 12B, and FIG. 12C are flowcharts 1200 describing methods for a digital wallet use case, according to embodiments.

At operation 1205, the OSP computer system generates a digital wallet for a user of the OSP.

At operation 1210, the OSP computer system adds at least a digital document representing an exemption certificate (also referred to as a "digital exemption certificate" herein) to the digital wallet. The digital exemption certificate may have been obtained directly from the user of the OSP, imported from a tax authority, or pushed by a tax authority to the OSP via an API exposed by the OSP towards the tax authority.

At operation 1215, the OSP computer system generates an expiration date associated with the digital exemption certificate based on analyzing the digital exemption certificate (e.g., based on extracting the expiration date from the digital exemption certificate). In an embodiment, the OSP also applies a hash algorithm to the digital exemption certificate to generate a hash value associated with the digital exemption certificate.

At operation 1220, the OSP computer system stores the expiration date associated with the exemption certificate (and possibly the hash value) in a database.

At operation 1225, the OSP computer system determines that a notification associated with the digital exemption certificate is to be generated based on the expiration date associated with the digital exemption certificate (e.g., based on the expiration date being less than a threshold number of days away).

At operation 1230, the OSP computer system generates the notification (e.g., indicating that the exemption certificate is about to expire) in response to the determination that the notification is to be generated.

At operation 1235, the OSP computer system transmits, over a network, the notification such that the user can view the notification.

Now referring to FIG. 12B, at operation 1240, the OSP computer system receives, over the network, a request by the user to view the digital exemption certificate.

At operation 1245, the OSP computer system retrieves the digital exemption certificate from a database in response to receiving the request to view the digital exemption certificate. In an embodiment, the OSP computer system applies a hash algorithm to the digital exemption certificate and verifies that the resulting hash value matches a previously stored hash value for the digital exemption certificate (e.g., to ensure that the digital exemption certificate has not been tampered with).

At operation 1250, the OSP computer system transmits, over the network, the digital exemption certificate to a device operated by the user as a response to the request to view the digital exemption certificate (e.g., if the hash values match).

At operation 1255, the OSP computer system receives, over the network, a request by the user to share the digital exemption certificate with a third party (where the third party may be an organization or an individual).

At operation 1260, the OSP computer system shares the digital exemption certificate with the third party in response to receiving the request to share the digital exemption certificate with the third party. For example, the OSP computer system may share the digital document by generating a link that is usable by the third party to access the digital exemption certificate and providing the link to the third party. In an embodiment, the link is a URL that indicates the digital exemption certificate being shared, the access rights being granted, the access expiration date/time, and a digital signature generated based on parts of the URL and signed by a private key.

Now referring to FIG. 12C, at operation 1265, the OSP computer system receives, over the network, a request by the user to generate a compliance badge for plumbing services.

At operation 1270, the OSP computer system generates the compliance badge in response to a determination that the digital wallet includes a digital document representing a plumber journeyman license, a digital document representing a plumbing license for the relevant state/jurisdiction, and a digital document representing a proof of insurance (e.g., this is the set of documents that fulfill the requirements associated with the compliance badge for plumbing services).

At operation 1275, the OSP computer system transmits, over the network, the compliance badge for plumbing services such that the compliance badge can be published to an external platform.

Figure 13A:
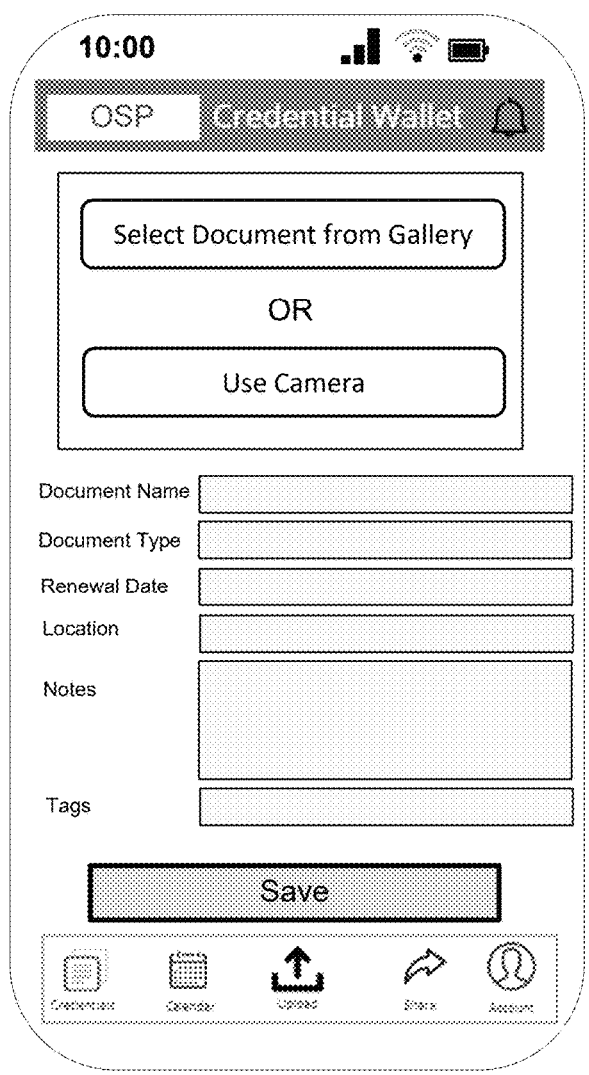
FIG. 13A is a diagram showing a GUI for uploading a digital document to a digital wallet service, according to embodiments.

FIG. 13A is a diagram showing a GUI for uploading a digital document to a digital wallet service, according to embodiments. The OSP computer system 1195 may cause the GUI to be projected onto the screen 1191. The GUI may be particularly suitable for displaying on a screen of a mobile device such as a smartphone or tablet.

The GUI shows a banner with the service provider's name ("OSP" in this example) and the name of the digital wallet service being provided ("Credential Wallet" in this example). The GUI also shows a button to select a document from a photo gallery ("Select Document from Gallery") and a button to take a picture of the document using a camera ("Use Camera"). The GUI shows a "Document Name" input field, a "Document Type" input field, a "Renewal Date" input field, a "Location" input field, a "Notes" input field, and a "Tags" input field. The GUI further shows a button to save the inputs ("Save"). The GUI further shows icons at the bottom portion for accessing various functionalities related to the digital wallet service such as a "Credentials" icon, a "Calendar" icon, an "Upload" icon, a "Share" icon, and an "Account" icon.

Figure 13B:
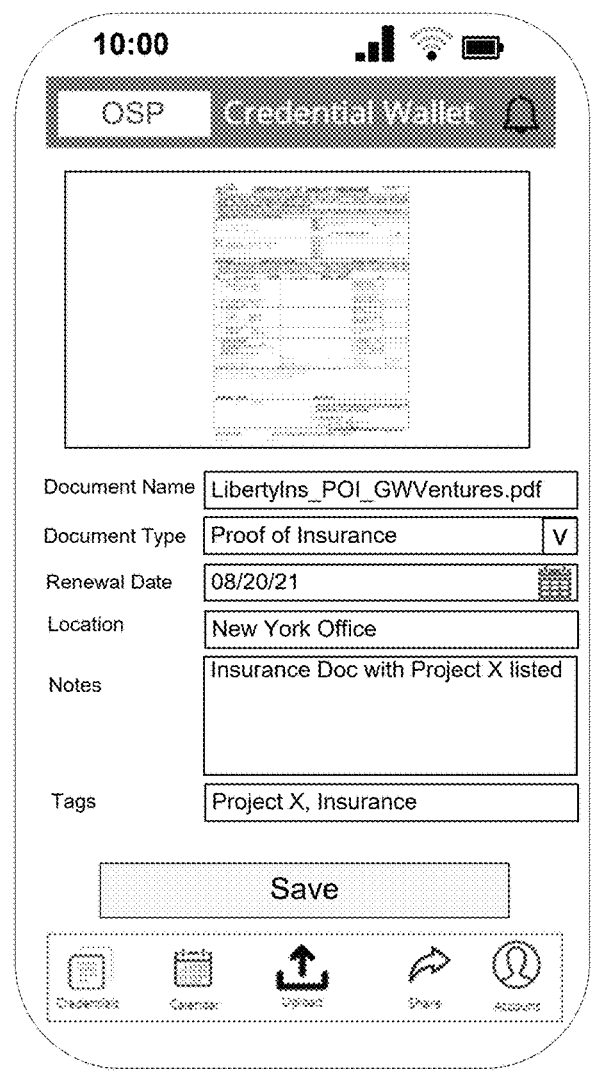
FIG. 13B is a diagram showing a GUI for uploading a digital document to a digital wallet service after the user has provided a digital document to be uploaded, according to embodiments.

FIG. 13B is a diagram showing a GUI for uploading a digital document to a digital wallet service after the user has provided a digital document to be uploaded, according to embodiments.

In this example, it is assumed that the user provided a digital proof of insurance document through the GUI (by selecting an image of the proof of insurance document from a photo gallery or taking a picture of the proof of insurance document using a camera). The GUI shows a preview of the digital proof of insurance. In an embodiment, the OSP analyzes the provided digital document to extract various metadata associated with the digital proof of insurance document and automatically populates the various input fields of the GUI with the extracted metadata. For example, the OSP may auto-populate one or more of the "Document Name" input field, the "Document Type" input field, the "Renewal Date" input field, the "Location" input field, a "Notes" input field, and the "Tags" input field, as shown in the diagram. One or more of the fields may be editable by the user through the GUI. In an embodiment, the OSP auto-populates a subset of the input fields and the user is expected to enter values into the other input fields. When the user is satisfied with the preview and the values of the input fields, the user may activate the "Save" button (e.g., by clicking/tapping on the button) to upload the digital proof of insurance document to the OSP and add the digital proof of insurance document (along with the associated metadata) to the user's digital wallet.

Figure 14:
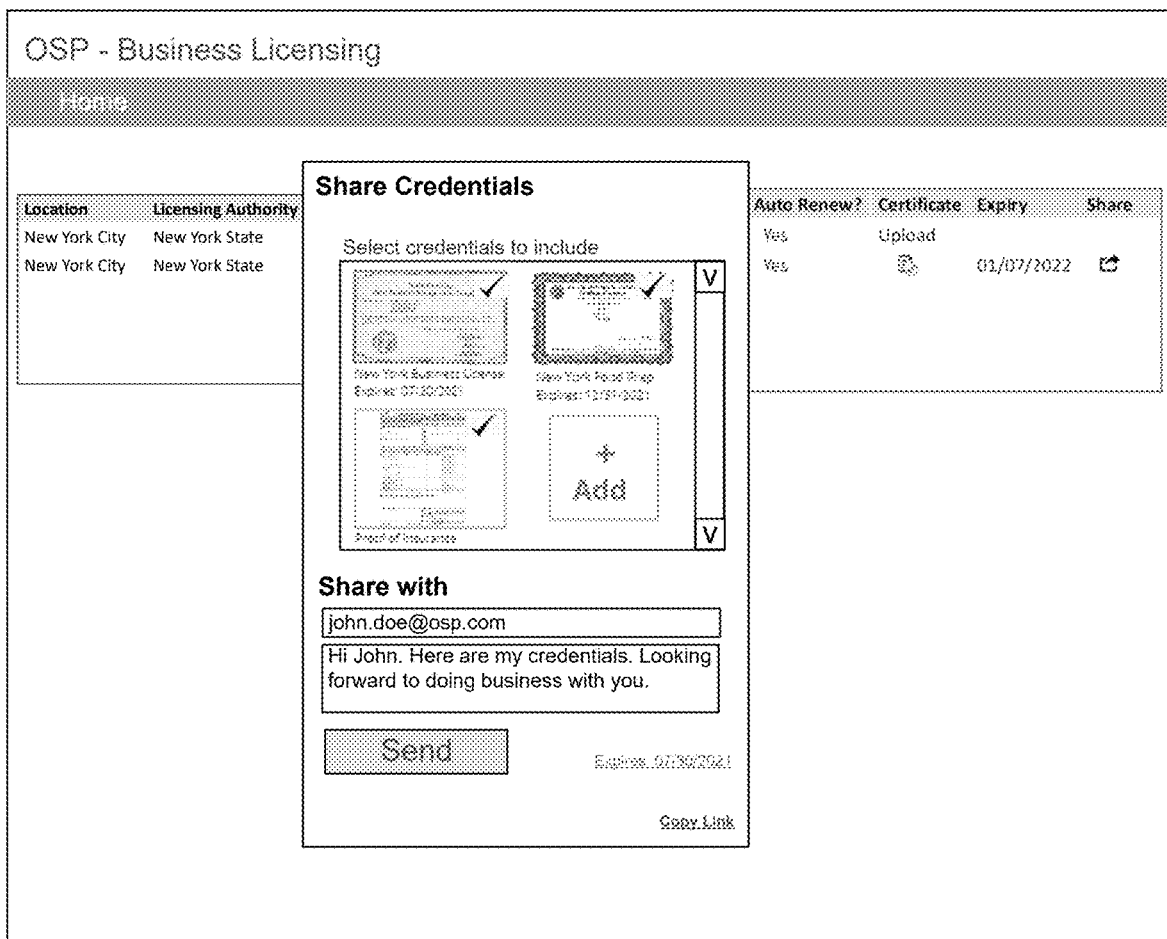
FIG. 14 is a diagram showing a GUI for sharing a digital document, according to embodiments.

FIG. 14 is a diagram showing a GUI for sharing a digital document, according to embodiments. The GUI may be particularly suitable for displaying on a screen of a desktop computer.

The GUI shows a user interface element for selecting one or more digital credentials to share with a third party. The GUI further shows an input field for entering the email address of the third party ("john.doe@osp.com" in this example) and an input field for entering a message for the third party ("Hi John. Here are my credentials. Looking forward to doing business with you" in this example). When the user has finished selecting the digital credentials to be shared and populating the relevant input fields, the user may activate the "Send" button to share the digital credentials with the third party. The GUI also shows a "Copy Link" button that the user can activate to copy a link that the third party can use to access the shared digital credentials to the user's clipboard.

Figure 15:
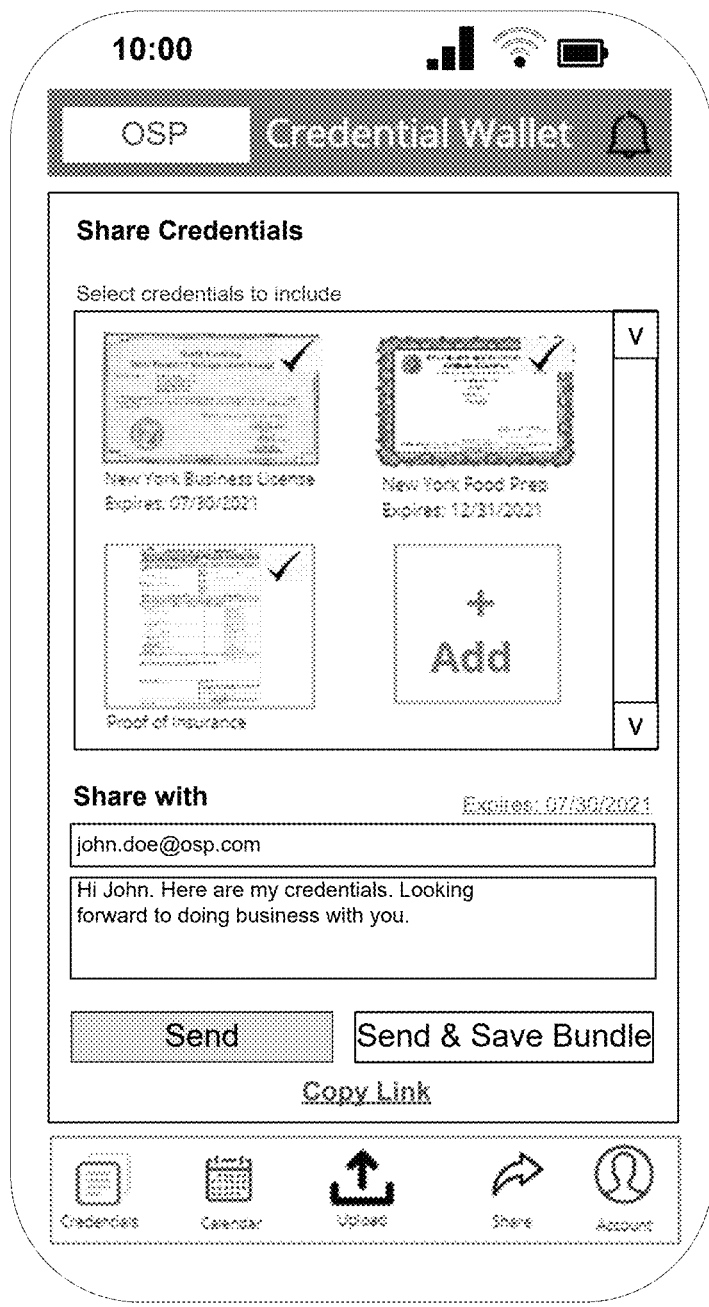
FIG. 15 is a diagram showing another GUI for sharing a digital document, according to embodiments.

FIG. 15 is a diagram showing another GUI for sharing a digital document, according to embodiments. The GUI may be particularly suitable for displaying on a screen of a mobile device such as a smartphone or tablet.

Similar to the GUI shown in FIG. 14, the GUI shows a user interface element for selecting one or more digital credentials to share with a third party, an input field for entering the email address of the third party, an input filed for entering a message for the third party, a "Send" button, and a "Copy Link" button. The user can interact with this GUI in a similar manner as described above to share one or more digital credentials with a third party.

Figure 16A:
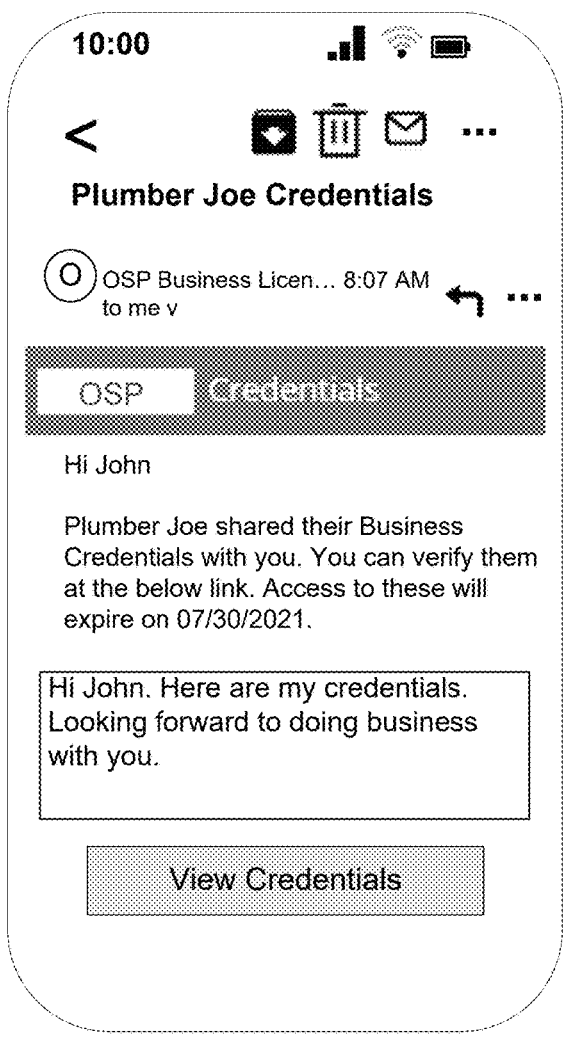
FIG. 16A is a diagram showing an email informing a third party that a user of the OSP has shared digital credentials with the third party, according to embodiments.

FIG. 16A is a diagram showing an email informing a third party that a user of the OSP has shared digital credentials with the third party, according to embodiments. The email may have been sent to a third party as a result of the user of the OSP sharing a set of digital credentials with the third party, for example, using the GUI shown in FIG. 14 or FIG. 15.

The email is addressed to the third party ("John" in this example) and indicates that the user of the OSP ("Plumber Joe" in this example) has shared digital credentials with the third party. The email indicates when access to the shared digital credentials will expire ("Jul. 30, 2021" in this example) and includes a customized message and a button/link for viewing the digital credentials shared by the user of the OSP with the third party ("View Credentials").

Figure 16B:
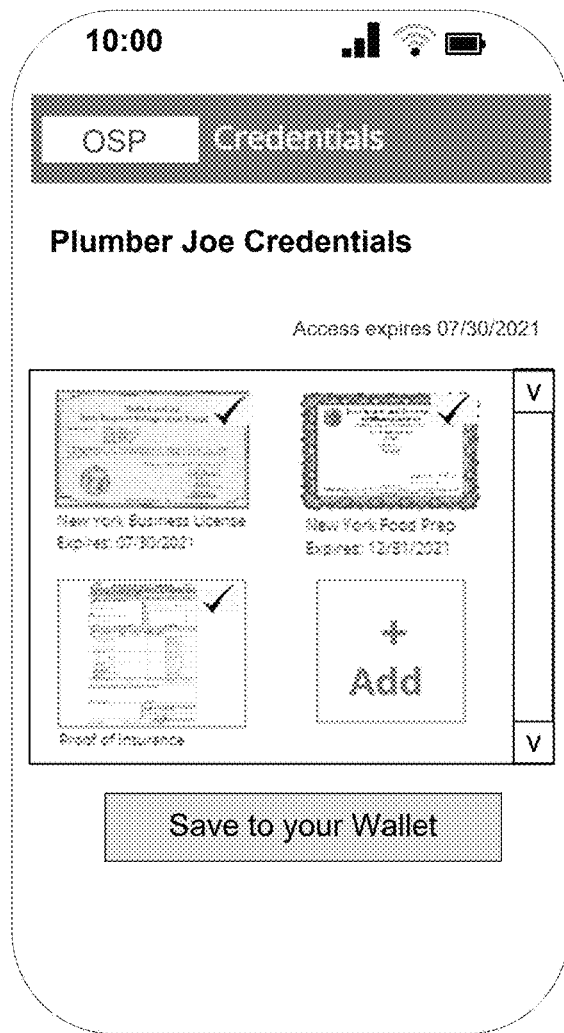
FIG. 16B is a diagram showing a GUI for viewing digital documents shared by a user of the OSP, according to embodiments.

FIG. 16B is a diagram showing a GUI for viewing digital documents shared by a user of the OSP, according to embodiments. The GUI may be shown on the display of the device operated by the third party as a result of the third party clicking on the "View Credentials" button/link shown in FIG. 16A. The GUI may be shown within an OSP application (or "app") running on the user's device. The GUI shows thumbnails of the set of digital credentials being shared with the third party (a New York business license, a New York food prep license, and a proof of insurance in this example). The GUI further shows when access to the digital credentials expires ("Jul. 30, 2021" in this example). The GUI further shows a button to save the digital credentials to the third party's own digital wallet (e.g., if the third party is also a user of the OSP and has a digital wallet).

Figure 17A:
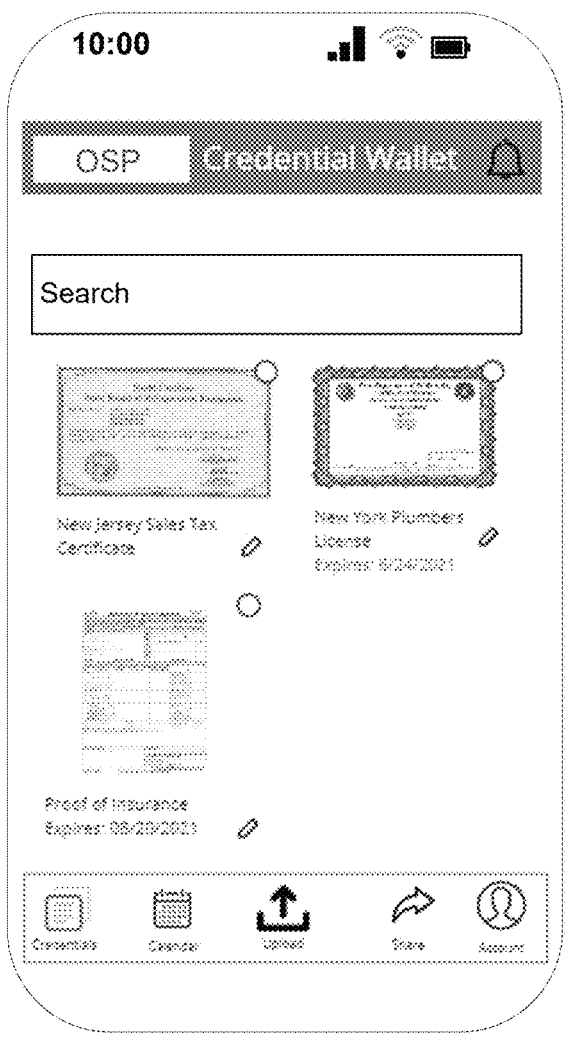
FIG. 17A is a diagram showing a GUI for notifying a user that a credential is about to expire, according to embodiments.

FIG. 17A is a diagram showing a GUI for notifying a user that a credential is about to expire, according to embodiments. The GUI shows a set of digital credentials that are currently in the user's digital wallet. The GUI further shows that one of the digital credentials (the New York Plumbers license in this example) will be expiring (on "Jun. 24, 2021" in this example).

Figure 17B:
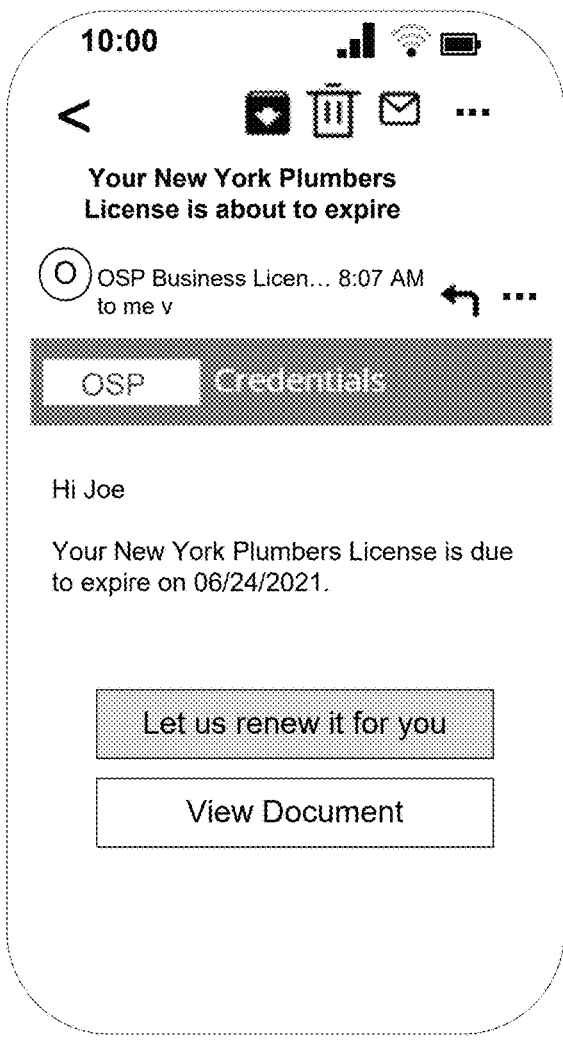
FIG. 17B is a diagram showing an email for notifying a user of the OSP that a credential is about to expire, according to embodiments.

FIG. 17B is a diagram showing an email for notifying a user of the OSP that a credential is about to expire, according to embodiments. The email may be sent as a result of the OSP determining that one of the user's credentials is about to expire.

The email indicates that one of the user's credentials (the New York Plumbers license in this example) is due to expire on Jun. 24, 2021 and also includes a button/link to renew the license through the OSP ("Let us renew it for you") and a button/link to view the digital credential ("View Document").

Figure 18:
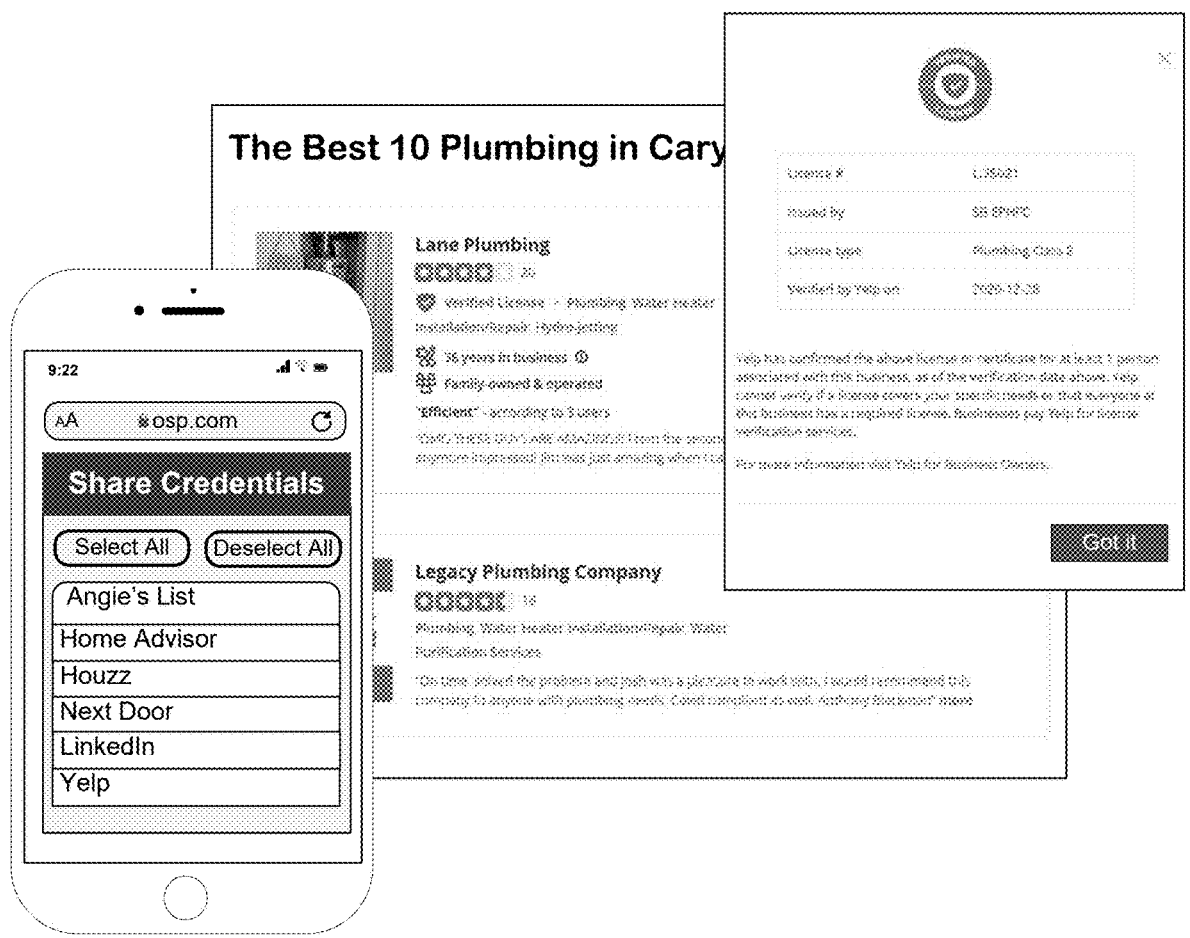
FIG. 18 is a diagram showing a GUI for publishing a compliance badge, according to embodiments.

FIG. 18 is a diagram showing a GUI for publishing a compliance badge, according to embodiments. The GUI shows a list of platforms to which a compliance badge can be published. The GUI may allow the user of the OSP to select one or more of the platforms to which to publish a compliance badge. The GUI further shows a button to select all of the platforms ("Select All") and a button to deselect all of the platforms ("Deselect All").

If the user publishes a compliance badge to a platform, the platform may indicate that the user's business has the necessary certifications/qualifications for performing the services associated with the compliance badge. For example, in the example shown in the diagram, the platform indicates that the "Lane Plumbing" business has a compliance badge for providing a plumbing service, a water heater installation/repair service, and a hydro-jetting service. The platform may provide additional details about a particular compliance badge if requested by a user of the platform. For example, in the example shown in the diagram, the platform shows additional details about the compliance badge for plumbing services such as the license number, the issuing/certifying authority, the license type, and when the license was last verified.

A person skilled in the art will be able to practice the present invention in view of this description, which is to be taken as a whole. Details have been included to provide a thorough understanding. In other instances, well-known aspects have not been described, in order to not obscure unnecessarily this description.

Some technologies or techniques described in this document may be known. Even then, however, it does not necessarily follow that it is known to apply such technologies or techniques as described in this document, or for the purposes described in this document.

This description includes one or more examples, but this fact does not limit how the invention may be practiced. Indeed, examples, instances, versions or embodiments of the invention may be practiced according to what is described, or yet differently, and also in conjunction with other present or future technologies. Other such embodiments include combinations and sub-combinations of features described herein, including for example, embodiments that are equivalent to the following: providing or applying a feature in a different order than in a described embodiment; extracting an individual feature from one embodiment and inserting such feature into another embodiment; removing one or more features from an embodiment; or both removing a feature from an embodiment and adding a feature extracted from another embodiment, while providing the features incorporated in such combinations and sub-combinations.

A number of embodiments are possible, each including various combinations of elements. When one or more of the appended drawings—which are part of this specification—are taken together, they may present some embodiments with their elements in a manner so compact that these embodiments can be surveyed quickly. This is true even if these elements are described individually extensively in this text, and these elements are only optional in other embodiments.

In general, the present disclosure reflects preferred embodiments of the invention. The attentive reader will note, however, that some aspects of the disclosed embodiments extend beyond the scope of the claims. To the respect that the disclosed embodiments indeed extend beyond the scope of the claims, the disclosed embodiments are to be considered supplementary background information and do not constitute definitions of the claimed invention.

In this document, the phrases "constructed to", "adapted to" and/or "configured to" denote one or more actual states of construction, adaptation and/or configuration that is fundamentally tied to physical characteristics of the element or feature preceding these phrases and, as such, reach well beyond merely describing an intended use. Any such elements or features can be implemented in a number of ways, as will be apparent to a person skilled in the art after reviewing the present disclosure, beyond any examples shown in this document.

Parent patent applications: Any and all parent, grandparent, great-grandparent, etc. patent applications, whether mentioned in this document or in an Application Data Sheet ("ADS") of this patent application, are hereby incorporated by reference herein as originally disclosed, including any priority claims made in those applications and any material incorporated by reference, to the extent such subject matter is not inconsistent herewith.

Reference numerals: In this description a single reference numeral may be used consistently to denote a single item, aspect, component, or process. Moreover, a further effort may have been made in the preparation of this description to use similar though not identical reference numerals to denote other versions or embodiments of an item, aspect, component or process that are identical or at least similar or related. Where made, such a further effort was not required, but was nevertheless made gratuitously so as to accelerate comprehension by the reader. Even where made in this document, such a further effort might not have been made completely consistently for all of the versions or embodiments that are made possible by this description. Accordingly, the description controls in defining an item, aspect, component or process, rather than its reference numeral. Any similarity in reference numerals may be used to infer a similarity in the text, but not to confuse aspects where the text or other context indicates otherwise.

The claims of this document define certain combinations and sub-combinations of elements, features and acts or operations, which are regarded as novel and non-obvious. The claims also include elements, features and acts or operations that are equivalent to what is explicitly mentioned. Additional claims for other such combinations and sub-combinations may be presented in this or a related document. These claims are intended to encompass within their scope all changes and modifications that are within the true spirit and scope of the subject matter described herein. The terms used herein, including in the claims, are generally intended as "open" terms. For example, the term "including" should be interpreted as "including but not limited to," the term "having" should be interpreted as "having at least," etc. If a specific number is ascribed to a claim recitation, this number is a minimum but not a maximum unless stated otherwise. For example, where a claim recites "a" component or "an" item, it means that the claim can have one or more of this component or this item.

In construing the claims of this document, 35 U.S.C. § 112 (f) is invoked by the inventor(s) only when the words "means for" or "steps for" are expressly used in the claims. Accordingly, if these words are not used in a claim, then that claim is not intended to be construed by the inventor(s) in accordance with 35 U.S.C. § 112 (f).

While the invention has been described in terms of several embodiments, those skilled in the art will recognize that the invention is not limited to the embodiments described, can be practiced with modification and alteration within the spirit and scope of the appended claims. The description is thus to be regarded as illustrative instead of limiting.

What is claimed is:

1. A method performed by a computer system, the method comprising:
   generating a digital document organizer for a user of an online software platform;
   adding at least a digital document to the digital document organizer, wherein the digital document represents a certification issued by a certifying authority;
   generating metadata associated with the digital document based on analyzing the digital document;
   storing the metadata associated with the digital document;
   receiving, over a network, a request by the user to view the digital document;
   retrieving the digital document from a database in response to receiving the request to view the digital document;
   transmitting, over the network, the digital document and the metadata associated with the digital document to a device operated by the user as a response to the request to view the document;
   receiving, over the network, a request by the user to share one or more documents in the digital document organizer with a third party;
   responsive to receiving the request to share the one or more documents, generating a uniform resource locator (URL) that is usable by the third party to access the one or more documents, wherein the URL includes a query string and a digital signature that was generated based on at least a portion of the query string and signed by a private key of the online software platform;
   transmitting, over the network, the URL to the third party such that the third party can use the URL to access the one or more digital documents;
   receiving a request to access the one or more documents via the URL; and
   verifying the digital signature included in the URL using the private key of the online software platform before granting access to the one or more documents.

2. The method of claim 1, wherein the metadata associated with the digital document includes a first hash value associated with the digital document that is generated by applying a hash algorithm to the digital document when the digital document is added to the digital document organizer, wherein the method further comprises:
   applying the hash algorithm to the digital document after the digital document is retrieved from the database to generate a second hash value; and
   ensuring that the second hash value matches the first hash value before transmitting the digital document to the device operated by the user.

3. The method of claim 1, further comprising:
   determining that a notification associated with the digital document is to be generated based on the metadata associated with the digital document;
   generating the notification associated with the digital document in response to the determination that the notification associated with the digital document is to be generated; and
   transmitting, over the network, the notification associated with the digital document such that the user can view the notification.

4. The method of claim 3, wherein the metadata associated with the digital document includes an expiration date associated with the digital document, wherein the determination that the notification associated with the digital document is to be generated is based on a determination that the expiration date is less than a threshold number of days away from a current date.

5. The method of claim 1, wherein the query string further includes an indication of the one or more digital documents being shared, an indication of access rights being granted, and an indication of an access expiration date, wherein the method further comprises:
- verifying that the access rights have not expired based on the access expiration date; and
- granting the access rights to the one or more documents in response to successfully verifying the digital signature and verifying that the access rights have not expired.

6. The method of claim 1, further comprising:
- receiving, over the network, a request by the user to add the digital document to the digital document organizer, wherein the digital document is added to the digital document organizer in response to receiving the request to add the respective digital document to the digital document organizer.

7. The method of claim 6, wherein the request to add the digital document to the digital document organizer includes the digital document.

8. The method of claim 6, wherein the request to add the digital document to the digital document organizer indicates that the digital document is to be imported from the certifying authority, wherein the method further comprises:
- importing the digital document from the certifying authority in response to receiving the request to add the digital document to the digital document organizer.

9. The method of claim 1, further comprising:
- receiving, via an application programming interface (API) exposed by the online software platform towards the certifying authority, the digital document and an identifier of the digital document organizer, wherein the digital document is added to the digital document organizer in response to receiving the digital document and the identifier of the digital document organizer via the API.

10. The method of claim 9, further comprising:
- receiving, via the API exposed by the online software platform towards the certifying authority, an update to the digital document; and
- updating the digital document in response to receiving the update via the API.

11. The method of claim 1, further comprising:
- receiving, over the network, a request by the user to generate a compliance badge;
- generating the compliance badge in response to a determination that the digital document organizer includes a set of documents that fulfill a set of requirements associated with the compliance badge; and
- transmitting, over the network, the compliance badge such that the compliance badge can be published to an external platform.

12. The method of claim 1, further comprising:
- adding at least another digital document to the digital document organizer, wherein the another digital document represents any one of: a license, an approval letter, a proof of insurance, and a contract.

* * * * *